(12) United States Patent
Katsavounidis

(10) Patent No.: US 11,910,039 B2
(45) Date of Patent: *Feb. 20, 2024

(54) ENCODING TECHNIQUE FOR OPTIMIZING DISTORTION AND BITRATE

(71) Applicant: NETFLIX Inc., Los Gatos, CA (US)

(72) Inventor: Ioannis Katsavounidis, San Jose, CA (US)

(73) Assignee: NETFLIX, INC., Los Gatos, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/882,386

(22) Filed: May 22, 2020

(65) Prior Publication Data

US 2020/0288187 A1 Sep. 10, 2020

Related U.S. Application Data

(63) Continuation of application No. 16/034,303, filed on Jul. 12, 2018, now Pat. No. 10,666,992.

(Continued)

(51) Int. Cl.
*H04N 21/2343* (2011.01)
*H04N 21/238* (2011.01)
(Continued)

(52) U.S. Cl.
CPC ..... *H04N 21/23439* (2013.01); *H04N 19/124* (2014.11); *H04N 19/147* (2014.11);
(Continued)

(58) Field of Classification Search
None
See application file for complete search history.

(56) References Cited

U.S. PATENT DOCUMENTS 5,612,742 A 3/1997 Krause et al.
7,394,410 B1 7/2008 Wegener
(Continued)

FOREIGN PATENT DOCUMENTS

CN 1393109 A 1/2003
CN 1778117 A 5/2006
(Continued)

OTHER PUBLICATIONS

Non-Final Office Action received for U.S. Appl. No. 16/054,621, dated Mar. 5, 2020, 35 pages.
(Continued)

*Primary Examiner* — Hsiungfei Peng
(74) *Attorney, Agent, or Firm* — Artegis Law Group, LLP

(57) ABSTRACT

An encoding engine encodes a video sequence to provide optimal quality for a given bitrate. The encoding engine cuts the video sequence into a collection of shot sequences. Each shot sequence includes video frames captured from a particular capture point. The encoding engine resamples each shot sequence across a range of different resolutions, encodes each resampled sequence with a range of quality parameters, and then upsamples each encoded sequence to the original resolution of the video sequence. For each upsampled sequence, the encoding engine computes a quality metric and generates a data point that includes the quality metric and the resample resolution. The encoding engine collects all such data points and then computes the convex hull of the resultant data set. Based on all convex hulls across all shot sequences, the encoding engine determines an optimal collection of shot sequences for a range of bitrates.

21 Claims, 13 Drawing Sheets

Related U.S. Application Data

(60) Provisional application No. 62/550,517, filed on Aug. 25, 2017, provisional application No. 62/534,170, filed on Jul. 18, 2017.

(51) Int. Cl.

| | |
|---|---|
| *H04N 21/2385* | (2011.01) |
| *H04N 21/845* | (2011.01) |
| *H04N 19/59* | (2014.01) |
| *H04N 19/124* | (2014.01) |
| *H04N 19/147* | (2014.01) |
| *H04N 19/179* | (2014.01) |
| *H04N 19/192* | (2014.01) |

(52) U.S. Cl.
CPC ......... *H04N 19/179* (2014.11); *H04N 19/192* (2014.11); *H04N 19/59* (2014.11); *H04N 21/23805* (2013.01); *H04N 21/234345* (2013.01); *H04N 21/8456* (2013.01)

(56) References Cited

U.S. PATENT DOCUMENTS

| | | | |
|---|---|---|---|
| 8,837,601 B2 | 9/2014 | Ronca et al. | |
| 8,982,942 B2 | 3/2015 | Gao et al. | |
| 9,036,712 B1 | 5/2015 | Cote et al. | |
| 9,131,202 B1 | 9/2015 | Espeset et al. | |
| 9,398,301 B2 | 7/2016 | Ronca et al. | |
| 9,584,700 B2 | 2/2017 | Morovic et al. | |
| 10,074,382 B2 | 9/2018 | Hoerich et al. | |
| 10,097,339 B1 * | 10/2018 | Pogue .................. | H04J 3/0667 |
| 10,666,992 B2 * | 5/2020 | Katsavounidis ..... | H04N 19/147 |
| 10,742,708 B2 | 8/2020 | Katsavounidis et al. | |
| 11,153,581 B1 | 10/2021 | Purushe | |
| 2002/0116715 A1 | 8/2002 | Apostolopoulos | |
| 2004/0161158 A1 | 8/2004 | Kondo et al. | |
| 2005/0031219 A1 | 2/2005 | Puri et al. | |
| 2005/0111824 A1 | 5/2005 | Hunter et al. | |
| 2007/0047639 A1 | 3/2007 | Ye | |
| 2007/0064793 A1 | 3/2007 | Wang et al. | |
| 2008/0043832 A1 | 2/2008 | Barkley et al. | |
| 2008/0232466 A1 | 9/2008 | Faerber et al. | |
| 2009/0295905 A1 | 12/2009 | Civanlar et al. | |
| 2010/0189183 A1 | 7/2010 | Gu et al. | |
| 2010/0202671 A1 | 8/2010 | Chen et al. | |
| 2010/0290520 A1 | 11/2010 | Kamisli et al. | |
| 2011/0052087 A1 | 3/2011 | Mukherjee | |
| 2011/0069939 A1 | 3/2011 | Choi et al. | |
| 2011/0075734 A1 | 3/2011 | Sakazume | |
| 2011/0090949 A1 * | 4/2011 | Gu ......................... | H04L 69/14 |
| | | | 375/240.01 |
| 2011/0286525 A1 | 11/2011 | Kamisli et al. | |
| 2012/0147958 A1 | 6/2012 | Ronca et al. | |
| 2012/0195369 A1 | 8/2012 | Guerrero | |
| 2012/0330632 A1 | 12/2012 | Oganov et al. | |
| 2013/0051768 A1 | 2/2013 | Soroushian et al. | |
| 2013/0089154 A1 | 4/2013 | Chen et al. | |
| 2013/0223510 A1 | 8/2013 | Coudurier et al. | |
| 2013/0329781 A1 * | 12/2013 | Su ........................ | H04N 21/242 |
| | | | 375/240.02 |
| 2014/0040498 A1 | 2/2014 | Oyman et al. | |
| 2014/0201324 A1 | 7/2014 | Zhang et al. | |
| 2014/0219346 A1 | 8/2014 | Ugur et al. | |
| 2014/0241418 A1 | 8/2014 | Garbas et al. | |
| 2014/0294362 A1 | 10/2014 | Pettersson et al. | |
| 2015/0071346 A1 | 3/2015 | Ronca et al. | |
| 2015/0127337 A1 | 5/2015 | Heigold et al. | |
| 2015/0179224 A1 | 6/2015 | Bloch et al. | |
| 2015/0370796 A1 | 12/2015 | Abramson et al. | |
| 2016/0094802 A1 | 3/2016 | Thomas et al. | |
| 2016/0212433 A1 | 7/2016 | Zhu et al. | |
| 2016/0379057 A1 | 12/2016 | Katsavounidis | |
| 2017/0078376 A1 | 3/2017 | Coward et al. | |
| 2017/0078686 A1 | 3/2017 | Coward et al. | |
| 2017/0186147 A1 | 6/2017 | He et al. | |
| 2018/0007355 A1 | 1/2018 | Borel et al. | |
| 2018/0041788 A1 | 2/2018 | Wang et al. | |
| 2018/0063536 A1 | 3/2018 | Carmel et al. | |
| 2018/0063549 A1 | 3/2018 | Amer et al. | |
| 2018/0160161 A1 | 6/2018 | Reznik et al. | |
| 2018/0240502 A1 | 8/2018 | Katsavounidis | |
| 2018/0241795 A1 | 8/2018 | Katsavounidis | |
| 2018/0242002 A1 | 8/2018 | Katsavounidis | |
| 2018/0242015 A1 | 8/2018 | Katsavounidis | |
| 2018/0302456 A1 | 10/2018 | Katsavounidis et al. | |
| 2018/0343458 A1 | 11/2018 | Katsavounidis et al. | |
| 2019/0028529 A1 | 1/2019 | Katsavounidis | |
| 2019/0028745 A1 | 1/2019 | Katsavounidis | |

FOREIGN PATENT DOCUMENTS

| | | |
|---|---|---|
| CN | 102668495 A | 9/2012 |
| CN | 102833538 A | 12/2012 |
| CN | 103501445 A | 1/2014 |
| CN | 103501446 A | 1/2014 |
| CN | 103918009 A | 7/2014 |
| CN | 103999090 A | 8/2014 |
| CN | 104185024 A | 12/2014 |
| CN | 104346613 A | 2/2015 |
| CN | 104737149 A | 6/2015 |
| CN | 105868700 A | 6/2015 |
| CN | 104767999 A | 7/2015 |
| CN | 106537923 A | 3/2017 |
| EP | 2 410 749 A1 | 1/2012 |
| JP | 2005-260576 A | 9/2005 |
| WO | 02/32141 A2 | 4/2002 |

OTHER PUBLICATIONS

Non-Final Office Action received for U.S. Appl. No. 15/902,971, dated Jul. 2, 2020, 36 pages.
Westerink et al., "An Optimal Bit Allocation Algorithm for Sub-Band Coding", ICASSP-88., International Conference on Acoustics, Speech, and Signal Processing, Apr. 11-14, 1988, pp. 757-760.
Riskin, Eve A., "Optimal Bit Allocation via the Generalized BFOS Algorithm", IEEE Transactions on Information Theory, Mar. 1, 1991, vol. 37, No. 2, pp. 400-402.
Yu et al., "Efficient Rate Control for JPEG-2000", IEEE Transactions on Circuits and Systems for Video Technology, May 1, 2006, vol. 16, No. 5, pp. 577-589.
Wu et al., "Rate-Constrained Picture-Adaptive Quantization for JPEG Baseline Coders", IEEE International Conference on Acoustics, Speech, and Signal Processing, Apr. 27-30, 1993, pp. 389-392.
Sermadevi et al., "Efficient Bit Allocation for Dependent Video Coding", DCC '04 Proceedings of the Conference on Data Compression, Mar. 23, 2004, 6 pages.
Ramchandran et al., "Bit Allocation for Dependent Quantization with Applications to Multiresolution and MPEG Video Coders", IEEE Transactions on Image Processing, Sep. 1994, vol. 3, No. 5, pp. 533-545.
Ortega et al., "Rate-Distortion Methods for Image and Video Compression", IEEE Signal Processing Magazine, Nov. 1998, vol. 15, No. 6, pp. 23-50.
Wiegand et al., "Overview of the H.264/AVC Video Coding Standard," DOI: 10.1109/TCSVT.2003.815165, Circuits and Systems for Video Technology, IEEE Transactions, vol. 13, No. 7, Jul. 2003, pp. 560-576.
L. Zhao, I. Katsavounidis, and C.-C. J. Kuo, "Another example of software replacing hardware: Real-time software MPEG-2 SDI/HD encoding for digital tv broadcasting," in NAB Broadcast Engineering Conference, 2003, pp. 37-40.
The NETFLIX tech blog: High quality video encoding at scale, link: http://techblog.netnix.com/2015/12/high-qualityvideo-encoding-at-scale.html.
A. Ortega and K. Ramchandran, "Rate-distortion methods for image and video compression: An overview," IEEE Signal Processing Magazine, vol. 15, No. 6, pp. 23-50, 1998.

(56) References Cited

OTHER PUBLICATIONS

I. E. Richardson, H. 264 and MPEG-4 video compression: video coding for next-generation multimedia. John Wiley & Sons, 2004.

R. G. Keys, "Cubic convolution interpolation for digital image processing," IEEE Trans. on Acoustics, Speech, and Signal Processing, vol. ASSP-29, No. 6, pp. 1153-1160, 1981.

Lanczos resampling, link: http://en.wikipedia.org/wiki/Lanczos resampling.

Nelflix Technology Blog, https://nelflixtechblog.com/per-tille-encode-Jptimization-7e99442b62a2, Dec. 14, 2015, 13 pages.

Katsavounidis et al., "Native resolution detection of video sequences," in SMPTE 2015 Annual Technical Conference and Exhibition, manuscript version dated Sep. 3, 2015, 26 pages.

Li et al.,"Toward a Practical Perceptual Video Quality Metric", Nelflix Technology Blog, https://nelflixtechblog.com/toward-a-practical-perceptual-video-quality-metric-653f208b9652, Jun. 6, 2016, 21 pages.

X264, link: https://en.wikipedia.org/wiki/X264.

S. Tavakoli, K. Brunnstrom, J. Gutierrez, and N. Garcia, "Quality of experience of adaptive video streaming: Investigation in service parameters and subjective quality assessment methodology," Signal Processing: Image Communication, vol. 39, pp. 432-443, 2015.

Consumer Digital Video Library—El Fuente, link: http://www.cdvl.org/documents/EIFuente_summary.pdf.

G. J. Sullivan and T. Wiegand, Rate-distortion optimization for video compression; IEEE signal processing magazine, vol. 15, No. 6, pp. 74-90, 1998.

T. Thiede, W. C. Treumiet, R. Billo, C. Schmidmer, T. Sporer, J_ G. Beerends, and C. Colomes, "Peaq-the ITU standard for objective measurement of perceived audio quality," Journal of the Audio Engineering Society, vol. 48, No. 1/2, pp. 3-29, 2000.

Consumer Digital Video Library; link: http://www.cdvl.org.

Advanced video coding for generic audiovisual services, I T U-T Rec. H.264 and ISO/IEC 14496-10 (AVG), 2003, 282 pages.

"High effciency video coding", I T U-T Rec. H.265 and ISO/IEC 23008-2 (HEVC), 2013, 317 pages.

Grange et al., "VP9 Bitstream & Decoding Process Specification", Version 0.6, Retrieved from https://storage.googleapis.com/downloads.webmprojecl.org/docs/vp9/vp9-bitstream-specification-v0.6-20160331-draft.pdf, 2016, 171 pages.

Suehring, Karsten, "H.264/AVC software", http://iphome.hhi.de/suehring/tml/, retrieved May 17, 2020,1 page.

"High Efficiency Video Coding (HEVC) I JCT-VG", Fraunhofer Heinrich Hertz Institute, hllps://hevc.hhi.fraunhofer.de, retrieved Apr. 17, 2020, 2 pages.

Webproject / libvpx, hllps://github.com/webmprojecl/libvpx, retrieved Apr. 17, 2020, 5 pages.

Bjontegaard, Gisle, "Calculation of average psnr differences between rd curves," I T U-T Q.6/SG16 VCEG 13th meeting, https://www.itu.int/wflp3/av-arch/video-site/0104_Aus/VCEG-M33.doc, 2001, 4 pages.

Katsavounidis, Ioannis, "NETFLIX-"El Fuente" video sequence details and scenes", Jul. 28, 2015, http://www.cdvl.org/documents/ElFuente_summary.pdf, 64 pages.

Katsavounidis, Ioannis, "NETFLIX- "Chimera" video sequence details and scenes", Nov. 2, 2015, https://www.cdvl.org/documents/NETFLIX_Chimera_4096x2160_Download_Instructions.pdf, 189 pages.

Wang et al., "Image Quality Assessment: From Error Visibility to Structural Similarity", DOI:10.1109/TIP.2003.819861, IEEE Transactions on Image Processing, vol. 13, No. 4, Apr. 2004, pp. 600-612.

Sheikh et al., "Image Information and Visual Quality", DOI:10.1109/TIP.2005.859378, IEEE Transactions on ImageProcessing, vol. 15, No. 2, Feb. 2006, pp. 430-444.

Nelflix / VMAF, https://github.com/Nelflix/vmaf, retrieved Apr. 17, 2020, 4 pages.

Li et al., "Full-Reference Video Quality Assessment by Decoupling Detail Losses and Additive Impairments", DOI:10.1109/TCSVT.2012.2190473, Circuits and Systems for Video Technology, IEEE Transactions, vol. 22, No. 7, Jul. 2012, pp. 1100-1112.

Winkler, Stefan, "Analysis of Public Image and Video Databases for Quality Assessment", DOI:10.1109/JSTSP.2012.2215007, IEEE Journal of Selected Topics in Signal Processing, vol. 6, No. 6, Oct. 2012, pp. 516-625.

Cortes et al., "Support-Vector Networks", Machine Learning, vol. 20, 1995, pp. 273-297.

Katsavounidis, Ioannis, "Dynamic optimizer—a perceptual video encoding optimization framework", Netflix Technology Blog, https://netflixtechblog.com/dynamic-optimizer-a-perceptual-video-encoding-optimization-framework-e19f1e3a277f, Mar. 5, 2018, 22 pages.

Manohara et al., "Optimized shot-based encodes: Now streaming!", Netflix Technology Blog, https://netflixtechblog.com/optimized-shot-based-encodes-now-streaming-4b9464204830, March 9, 2018, 9 pages.

"mirror / x264", https://github.com/mirror/x264, retrieved May 17, 2020, 1 page.

"FFmpeg / FFmpeg", https://github.com/FFmpeg/FFmpeg, retrieved May 17, 2020, 3 pages.

Videolan / x265, https://github.com/videolan/x265, retrieved May 17, 2020, 1 page.

"Eve-VP9 Maximize the Capabilities of VP9 for Your Video Streaming", Two Orioles, https://www.twoorioles.com/eve-vp9, retrieved May 17, 2020, 7 pages.

Wang et al., "Videoset: A large-scale compressed video quality dataset based on JND measurement", http://dx.doi.org/10.1016/j.jvcir.2017.04.009, Journal of Visual Communication and Image Representation, vol. 46, 2017, pp. 292-302.

Mareddy et al., "Simplifying Media Innovation at Netflix with Archer", Netflix Technology Blog, https://netflixtechblog.com/simplifying-media-innovation-at-nelflix-with-archer-3f8cbb0e2bcb, Jun. 20, 2018, 13 pages.

Final Office Action received for U.S. Appl. No. 16/054,621, dated Aug. 25, 2020, 29 pages.

International Search Report for application No. PCT/US2020/046017 dated Oct. 12, 2020.

Tan et al., "Video Quality Evaluation Methodology and Verification Testing of HEVC Compression Performance", IEEE Fransactions on Circuits and Systems for Video Technology, XP011592174, DOI: 10.1109/TCSVT.2015.2477916, vol. 26, No. 1, Jan. 1, 2016, pp. 76-90.

Hanhart et al., "Calculation of average coding efficiency based on subjective quality scores", Journal of Visual Communication and Image Representation, Academic Press, XP028661468, http://dx.doi.org/10.1016/j.vcir.2013.11.008, vol. 25, No. 3, Dec. 4, 2013, pp. 555-564.

Ortega, Antonio, "Optimal bit allocation under multiple rate constraints", Proceedings of Data Compression Conference—DCC '96, 10.1109/DCC.1996.488340, 1996, pp. 349-358.

Non-Final Office Action received for U.S. Appl. No. 15/902,971, dated Mar. 17, 2021, 36 pages.

Final Office Action received for U.S. Appl. No. 15/902,976 dated Jul. 10, 2020, 54 pages.

Non-Final Office Action received for U.S. Appl. No. 16/543,476 dated Jul. 6, 2020, 97 pages.

Non-Final Office Action received for U.S. Appl. No. 16/053,754 dated Aug. 12, 2020, 29 pages.

Notice of Allowance received for U.S. Appl. No. 15/902,970 dated Sep. 4, 2020, 44 pages.

Notice of Allowance received for U.S. Appl. No. 16/054,621 dated Jan. 27, 2021, 23 pages.

Final Office Action received for U.S. Appl. No. 15/902,971 dated Dec. 10, 2020, 51 pages.

Notice of Allowance received for U.S. Appl. No. 15/902,976 dated Sep. 30, 2020, 18 pages.

Non-Final Office Action received for U.S. Appl. No. 16/543,476 dated Jan. 7, 2021, 129 pages.

Final Office Action received for U.S. Appl. No. 16/053,754 dated Jan. 28, 2021, 30 pages.

Non-Final Office Action received for U.S. Appl. No. 15/902,971 dated Mar. 17, 2021, 46 pages.

Notice of Allowance received for U.S. Appl. No. 16/054,621 dated Apr. 16, 2021, 23 pages.

(56) References Cited

OTHER PUBLICATIONS

Non-Final Office Action received for U.S. Appl. No. 17/151,079, dated Nov. 24, 2021, 47 pages.
Notice of Allowance received for U.S. Appl. No. 16/054,621 dated Jun. 10, 2021, 14 pages.
Notice of Allowance received for U.S. Appl. No. 16/543,476 dated Jun. 25, 2021, 16 pages.
Notice of Allowance received for U.S. Appl. No. 15/902,971 dated Jul. 21, 2021, 17 pages.
Non Final Office Action received for U.S. Appl. No. 16/053,754 dated Jul. 16, 2021, 26 pages.
Non Final Office Action received for U.S. Appl. No. 16/987,331 dated Nov. 29, 2021, 54 pages.
Final Office Action received for U.S. Appl. No. 16/053,754 dated Feb. 9, 2022, 18 pages.
Final Office Action received for U.S. Appl. No. 17/151,079 dated Jun. 2, 2022, 21 pages.
Non Final Office Action received for U.S. Appl. No. 16/053,754 dated Jul. 6, 2022, 23 pages.
Non Final Office Action received for U.S. Appl. No. 17/170,661 dated Mar. 2, 2022, 44 pages.
Notice of Allowance received for U.S. Appl. No. 16/987,331 dated Apr. 20, 2022, 17 pages.
Final Office Action received for U.S. Appl. No. 17/170,661 dated Aug. 22, 2022, 30 pages.
Non Final Office Action received for U.S. Appl. No. 17/151,079 dated Sep. 29, 2022, 17 pages.
Final Office Action received for U.S. Appl. No. 16/053,754 dated Jan. 26, 2023, 17 pages.
Non Final Office Action received for U.S. Appl. No. 17/504,412 dated Feb. 2, 2023, 50 pages.
Non Final Office Action received for U.S. Appl. No. 17/516,525 dated Mar. 17, 2023, 48 pages.
Notice of Allowance received for U.S. Appl. No. 17/151,079 dated Apr. 19, 2023, 18 pages.
Non Final Office Action received for U.S. Appl. No. 17/516,525 dated May 22, 2023, 84 pages.
Notice of Allowance received for U.S. Appl. No. 17/504,412 dated Jun. 1, 2023, 17 pages.
Notice of Allowance received for U.S. Appl. No. 17/170,661 dated Jul. 3, 2023, 25 pages.
Notice of Allowance received for U.S. Appl. No. 17/516,525 dated Jul. 12, 2023, 17 pages.
Non Final Office Action received for U.S. Appl. No. 16/053,754 dated Sep. 19, 2023, 18 pages.
Final Office Action received for U.S. Appl. No. 17/532,869 dated Nov. 2, 2023, 46 pages.

\* cited by examiner

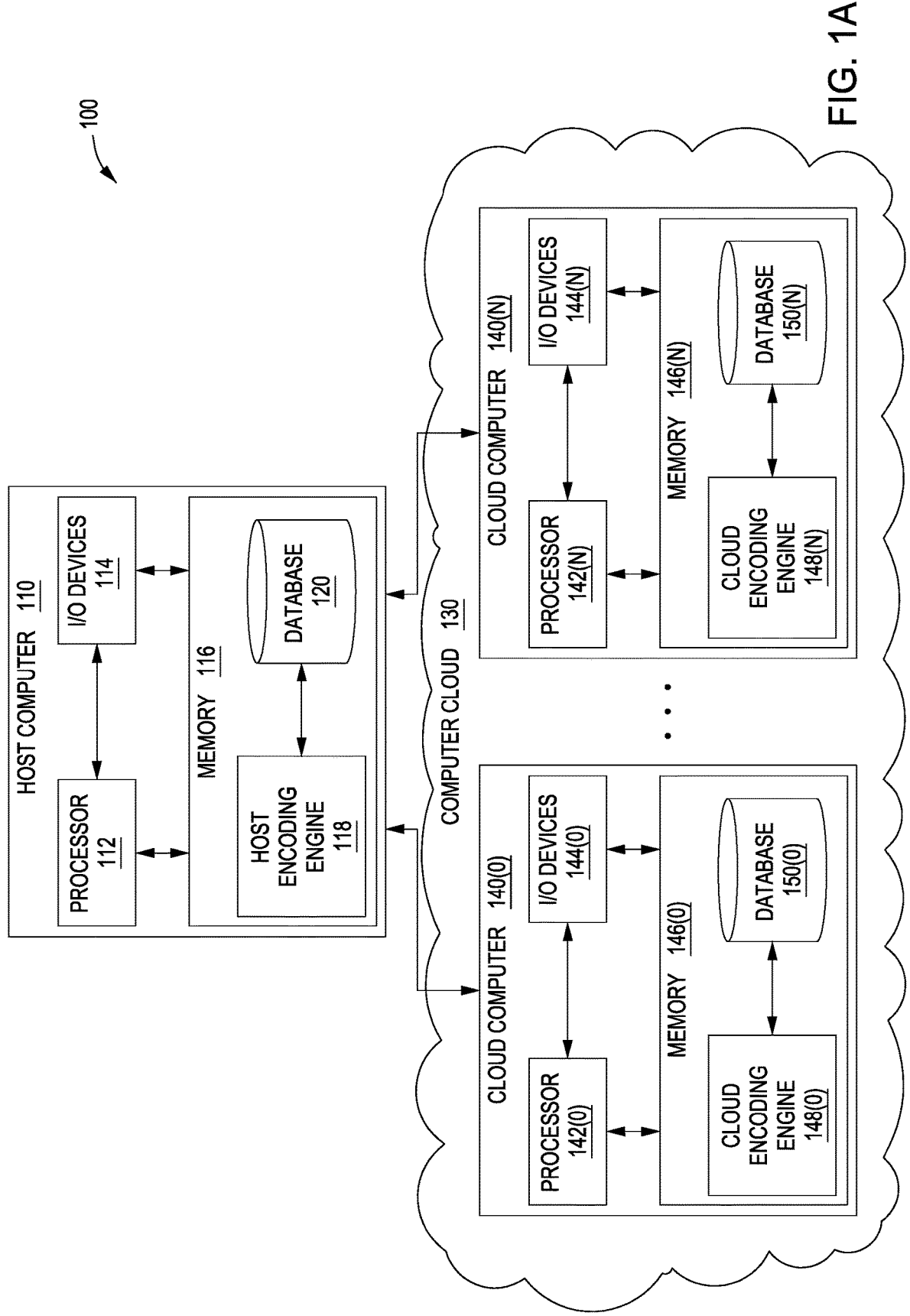

ENCODING TECHNIQUE FOR OPTIMIZING DISTORTION AND BITRATE

CROSS-REFERENCE TO RELATED APPLICATIONS

This application is a continuation of United States patent application titled, "ENCODING TECHNIQUES FOR OPTIMIZING DISTORTION AND BITRATE," filed on Jul. 12, 2018 and having Ser. No. 16/034,303, which claims the priority benefit of the United States Provisional patent application titled, "ENCODING TECHNIQUES FOR OPTIMIZING DISTORTION AND BITRATE", filed Jul. 18, 2017 and having Ser. No. 62/534,170 and which also claims the priority benefit of the United States Provisional patent application titled, "ENCODING TECHNIQUES FOR OPTIMIZING DISTORTION AND BITRATE", filed Aug. 25, 2017 and having Ser. No. 62/550,517. The subject matter of these related applications is hereby incorporated herein by reference.

BACKGROUND OF THE INVENTION

Field of the Invention

Embodiments of the present invention relate generally to video encoding and, more specifically, to encoding techniques for optimizing distortion and bitrate.

Description of the Related Art

A video streaming service provides access to a library of media titles that can be played on a range of different endpoint devices. Each endpoint device may connect to the video streaming service under different connection conditions, including available bandwidth and latency, among others. In addition, each different device may include different hardware for outputting the video content to the end user. For example, a given endpoint device could include a display screen having a particular screen size and a particular screen resolution.

Typically, an endpoint device that connects to a video streaming service executes an endpoint application that determines, for a given media title in the video content library, an appropriate version of the media title to stream to the endpoint device. Each different version of a given media title is usually encoded using a different bitrate, and the different versions of the media title have resolutions, scaling factors, and/or other parameters typically associated with video content that differ from one another. During playback of the media title on the endpoint device, the endpoint application selects the appropriate version of the media title to stream to the endpoint device based on factors such as network conditions, the quality of the network connection, and the hardware specifications of the endpoint device.

As noted above, to prepare a media title for streaming in the manner described above, the media title is encoded using multiple different bitrates. In doing so, an encoding application performs individual, "monolithic" encodes of the entire media title, using a different set of encoding parameters for each encode. Each different encode may be associated with a different quality metric that objectively indicates the level of distortion introduced into that encoded version of the media title via the encoding process. The quality metric associated with a given encode typically depends on the encoding parameters used to generate that encode. For example, an encode generated with a high bitrate compared to another encode could have a higher quality metric compared to that other encode.

Encoding a media title with different encoding parameters typically requires different computational resources and different storage resources. For example, generating an encode with a high bitrate and high quality metric generally consumes more computational/storage resources than generating an encode with a low bitrate and low quality metric. A conventional encoding application may select a given set of encoding parameters for generating a single monolithic encode in order to meet a particular target quality metric for that encode.

However, one problem with this approach is that not all portions of a media title require the same encoding parameters to meet a given target quality metric, yet conventional encoding applications use the same encoding parameters for the entire media title. Consequently, a conventionally-encoded media title may consume excessive computational and storage resources to meet the target quality metric, despite some portions of the media title not needing those resources to meet the same metric. This inefficiency needlessly wastes computational resources and storage resources.

As the foregoing illustrates, what is needed in the art is a more efficient technique for encoding video sequences.

SUMMARY OF THE INVENTION

One embodiment of the present invention sets forth a computer-implemented method, including generating a first set of encoded chunks for a source video sequence, generating a first set of data points based on the first set of encoded chunks, performing one or more convex hull operations across the first set of data points to compute a first subset of data points that are optimized across at least two metrics, computing a first slope value between a first data point included in the first subset of data points and a second data point included in the first subset of data points, and determining, based on the first slope value, that a first encoded chunk associated with the first data point should be included in a final encoded version of the source video sequence.

At least one technological improvement of the disclosed techniques relative to prior art is that performing optimization operations at the granularity of the encoded chunks reduces encoding inefficiencies associated with conventional encoding techniques. As a result, the final encoded version of the source video sequence can be streamed to endpoint devices with an increased visual quality for a target bitrate. Conversely, the final encoded version of the source video sequence can be streamed to endpoint devices with a reduced bitrate for a target visual quality.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 1A illustrates a cloud computing environment configured to implement one or more aspects of the present invention;

DETAILED DESCRIPTION

Figure 1B:
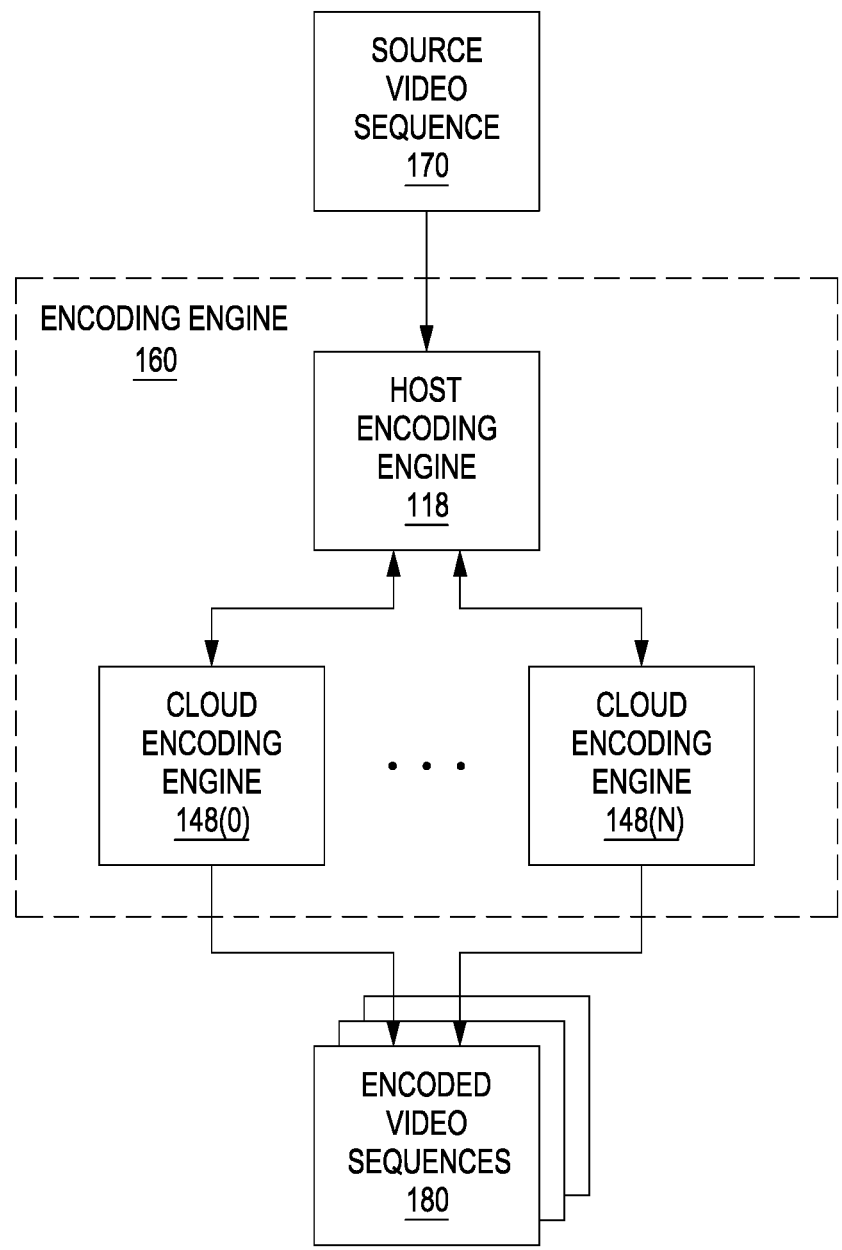
FIG. 1B is a more detailed illustration of the encoding engines of FIG. 1A, according to various embodiments of the present invention.

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

As discussed above, conventional encoding techniques suffer from specific inefficiencies associated with performing "monolithic" encodes of video sequences. These inefficiencies arise because conventional encoding techniques encode all portions of a video sequence with the same encoding parameters to meet a given quality metric, despite the fact that some portions of the video sequence could be encoded with different encoding parameters and still meet the same quality metric.

To address this issue, embodiments of the present invention include an encoding engine configured to encode different shot sequences within a source video sequence with different encoding parameters that optimize bitrate for a given level of distortion. When encoding a shot sequence, the encoding engine resamples the shot sequence to a range of different resolutions and then encodes each resampled sequence using a range of quality parameters. The encoding engine then upsamples each encoded sequence to the original resolution of the source video sequence and computes a quality metric for the resultant upsampled sequences. Based on the upsampled sequences and corresponding quality metrics for each shot sequence, the encoding engine generates different encoded versions of the source video sequence. Each such version is a composite of multiple shot sequences encoded with potentially different encoding parameters.

An advantage of this approach is that portions of the source video sequence needing specific encoding parameters to meet a given quality metric are encoded with precisely those specific encoding parameters. Further, other portions of the source video sequence can be encoded with other appropriately chosen encoding parameters. Accordingly, encoded versions of the source video sequence are generated in a more efficient manner.

System Overview

FIG. 1A illustrates a cloud-computing environment configured to implement one or more aspects of the present invention. As shown, a system 100 includes a host computer 110 coupled to a computer cloud 130. Host computer 110 includes a processor 112, input/output (I/O) devices 114, and a memory 116 coupled together.

Processor 112 may be any technically feasible form of processing device configured to process data and execute program code. Processor 112 could be, for example, a central processing unit (CPU), a graphics processing unit (GPU), an application-specific integrated circuit (ASIC), a field-programmable gate array (FPGA), any technically feasible combination of such units, and so forth.

I/O devices 114 may include devices configured to receive input, including, for example, a keyboard, a mouse, and so forth. I/O devices 114 may also include devices configured to provide output, including, for example, a display device, a speaker, and so forth. I/O devices 114 may further include devices configured to both receive and provide input and output, respectively, including, for example, a touchscreen, a universal serial bus (USB) port, and so forth.

Memory 116 may include any technically feasible storage medium configured to store data and software applications. Memory 116 could be, for example, a hard disk, a random access memory (RAM) module, a read-only memory (ROM), and so forth. Memory 116 includes a host encoding engine 118 and a database 120.

Host encoding engine 118 is a software application that, when executed by processor 112, performs an encoding operation with media content stored within database 120 and/or an external storage resource. Host encoding engine 118 is configured to interoperate with various cloud encoding engines discussed in greater detail below.

Computer cloud 130 includes a plurality of cloud computers 140(0) through 140(N). Any cloud computer 140 may be a physically separate computing device or a virtualized instance of a computing device. Each cloud computer 140 includes a processor 142, I/O devices 144, and a memory 146, coupled together. A given processor 142 may be any technically feasible form of processing device configured to process data and execute program code, including a CPU, a GPU, an ASIC, an FPGA, any technically feasible combination of such units, and so forth. A given set of I/O devices 144 may include devices configured to receive input, including, for example, a keyboard, a mouse, and so forth, similar to I/O devices 114 discussed above. Each memory 146 is a storage medium configured to store data and software applications, including cloud encoding engine 148 and database 150.

Cloud encoding engines 148(0) through 148(N) are configured to interoperate with host encoding engine 118 in order to perform various portions of an encoding operation. In general, host encoding engine 118 coordinates the operation of cloud encoding engines 148(0) through 148(N), and may perform tasks such as distributing processing tasks to those engines, collecting processed data from each engine, and so forth. Persons familiar with cloud computing will understand that cloud encoding engines 148(0) through 148(N) may operate substantially in parallel with one another. Accordingly, host encoding engine 118 may perform complex encoding tasks efficiently by configuring cloud encoding engines 148 to perform separate tasks simultaneously. As a general matter, host encoding engine 118 and cloud encoding engines 148 represent different modules within a distributed software entity, as described in greater detail below in conjunction with FIG. 1B.

FIG. 1B is a more detailed illustration of the encoding engines of FIG. 1A, according to various embodiments of the present invention. As shown, an encoding engine 160 includes host encoding engine 118 and cloud encoding engines 148(0) through 148(N). As a general matter, encoding engine 160 constitutes a distributed software entity configured to perform one or more different encoding operations via execution of host encoding engine 118 and cloud encoding engines 140. In particular, encoding engine 160 processes a source video sequence 170 to generate a set of encoded video sequences 180. Source video sequence 170 is a media title that may be included in a content library associated with a video streaming service. Each encoded video sequence 180 is a different version of that media title encoded with different (and potentially varying) encoding parameters.

To perform the encoding operation, encoding engine 160 preprocesses source video sequence 170 to remove extraneous pixels and then cuts source video sequence 170 into a plurality of shot sequences. Each shot sequence includes frames captured continuously from a given camera or point of capture. This procedure is discussed in conjunction with FIG. 2. Encoding engine 160 then resamples each shot sequence into one or more different resolutions, and processes all resampled sequences to generate a dataset. The resampling process is discussed in conjunction with FIG. 3. Generation of the dataset based on resampled sequences is discussed in conjunction with FIG. 4. Encoding engine 160 then generates, based on the dataset, a convex hull of data points that maximize bitrate for a given level of distortion, as discussed in conjunction with FIGS. 5A-5B and FIG. 6. Based on all convex hull points across all shot sequences, encoding engine 160 generates the set of encoded video sequences 180. These encoded video sequences optimize distortion and bitrate, as discussed in conjunction with FIGS. 7-9. The encoding operation discussed in conjunction with FIGS. 3-9 is also presented as a series of steps in conjunction with FIGS. 10-11.

Optimizing Distortion and Bitrate

Figure 2:
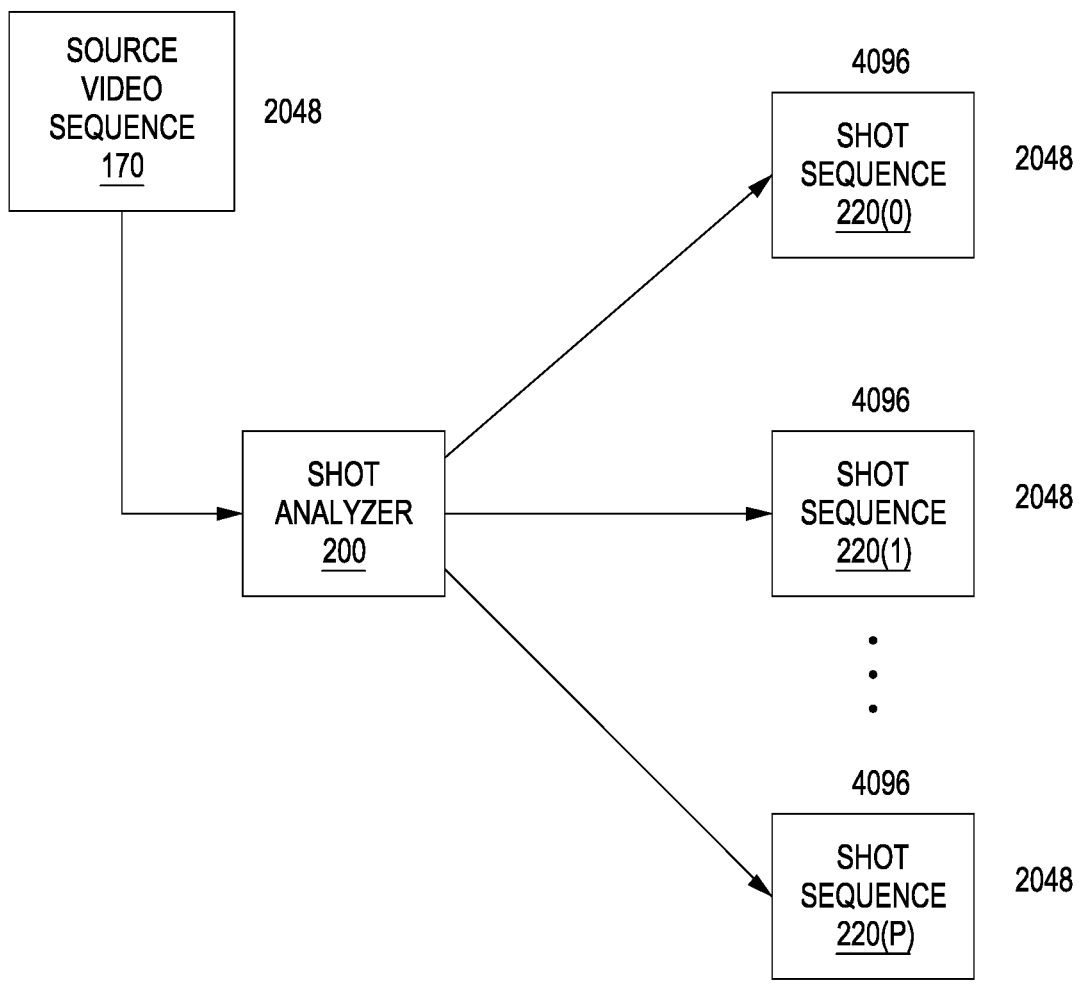
FIG. 2 illustrates how the encoding engines of FIG. 1B cut a video sequence into shot sequences, according to various embodiments of the present invention.

FIG. 2 illustrates how the encoding engines of FIG. 1B cut a video sequence into shot sequences, according to various embodiments of the present invention. As mentioned above in conjunction with FIGS. 1-2, encoding engine 160 is configured to perform an encoding operation to generate different encoded versions of source video sequence 170, where each different version minimizes distortion for a given bitrate and/or optimizes distortion and bitrate. A first step in that encoding operation is illustrated in FIG. 2. As shown, a shot analyzer 200 is configured to process source video sequence 170 to generate shot sequences 220(0) through 220(P). Shot analyzer 200 is a software module included within encoding engine 160. In the example shown, source video sequence 170 includes frames of video having a 4096×2048 resolution, meaning a 4096 pixel width by 2048 pixel height. The resolution of source video sequence 170 generally corresponds to the particular distribution format associated with the video sequence.

Shot analyzer 200 generates each shot sequence 220 to have the same resolution as source video sequence 170. However, each shot sequence 220 includes a different sequence of video frames that corresponds to a different "shot." In the context of this disclosure, a "shot" may be a sequence of frames captured continuously from a single camera or virtual representation of a camera (e.g., in the case of computer animated video sequences). In generating shot sequences 220, shot analyzer 200 may also remove extraneous pixels from source video sequence 170. For example, shot analyzer 200 may remove pixels included in black bars along border sections of source video sequence 170.

Shot analyzer 200 may determine which frames of source video sequence 170 correspond to each different shot using many different techniques. For example, shot analyzer 200 could identify a set of sequential frames having a continuous distribution of pixel values that do not change significantly across a subset of two or more sequential frames. Alternatively, shot analyzer 200 could compare features present in each frame and identify sequential frames having similar features. Persons skilled in the art will understand that many techniques for parsing a source video sequence into separate shot sequence exist. Upon parsing source video sequence 170 in this manner, encoding engine 160 processes each shot sequence 220 to generate a different dataset, as described below in conjunction with FIG. 3.

Figure 3:
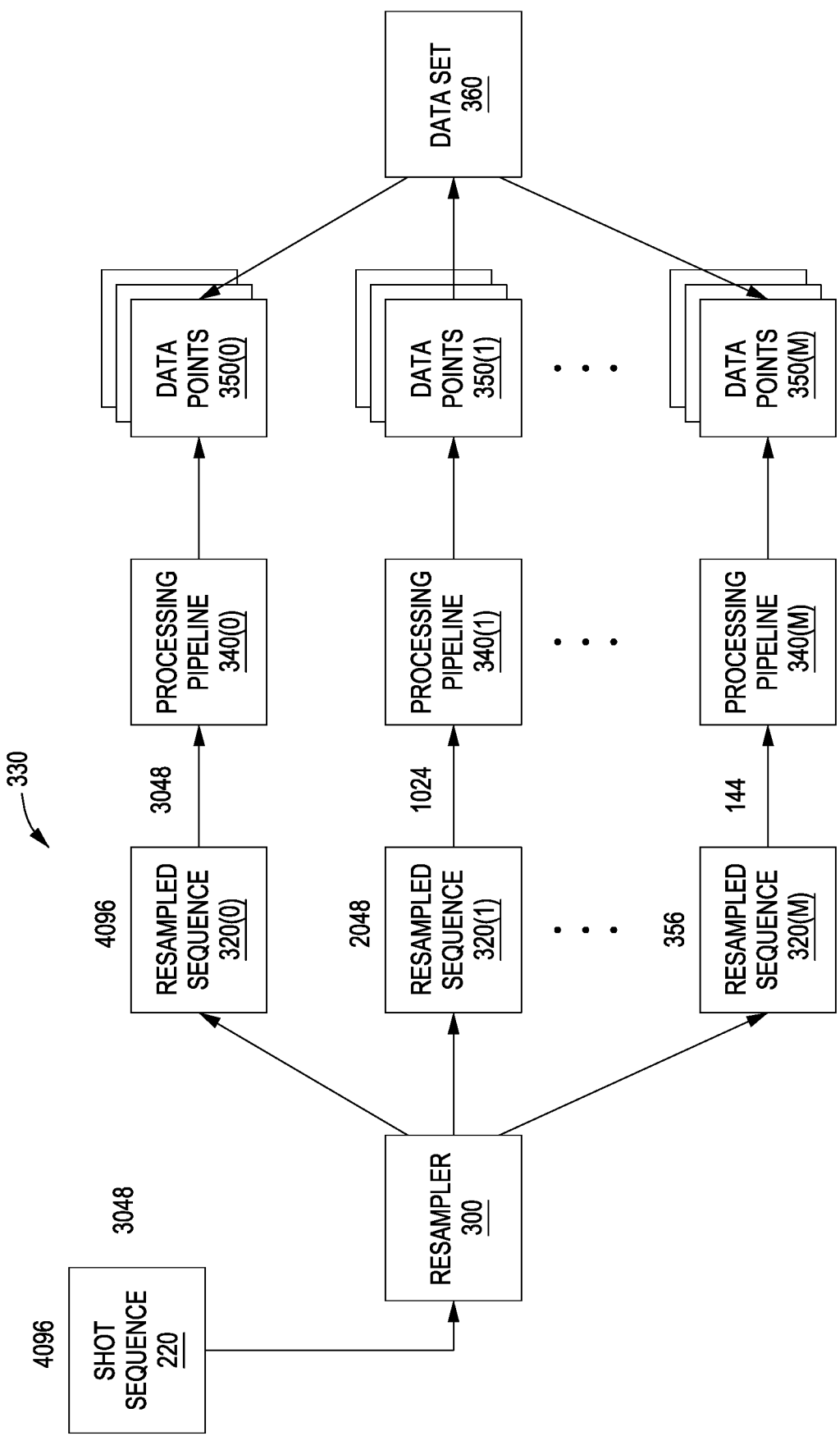
FIG. 3 illustrates how the encoding engines of FIG. 1B process the shot sequences of FIG. 2 to generate a dataset, according to various embodiments of the present invention.

FIG. 3 illustrates how the encoding engines of FIG. 1B process the shot sequences of FIG. 2 to generate a dataset, according to various embodiments of the present invention. As shown, a resampler 300 processes a shot sequence 220 to generate resampled sequences 320(0) through 320(M). Each resampled sequence 320 has a different resolution, as is shown. Resampled sequence 320(0) has a resolution of 4096×2048, resampled sequence 320(1) has a resolution of 2048×1024, and resampled sequence 220(M) has a resolution of 256×144. The set of resampled sequences 320 corresponds to a resolution ladder 330 that is associated with the shot sequence 220.

Resampler 300 may generate resolution ladder 330 to include any distribution of resolutions. In practice, however, resampler 300 first generates resampled sequence 320(0) to have the same resolution as shot sequence 220 (or source video sequence 170), and then generates each subsequent resampled sequence 320(1) onwards to have a resolution that is a constant fraction of the previous resolution. In practice, the ratio between the resolution of a given resampled sequence 320(H) and a previous resampled sequence 320(H−1) is approximately 1.5.

However, in various embodiments a denser resolution ladder may be used, i.e. with a ratio between the resolution of a given resampled sequence 320(H) and a previous resampled sequence 320(H−1) of less than 1.5, such as 1.414 or 1.26, or a coarser resolution ladder, i.e. with a ratio between the resolution of a given resampled sequence 320(H) and a previous resampled sequence 320(H−1) of more than 1.5, such as 2.0 or 3.0. The density of resolution ladder 330 can also depend on the characteristics of the video shot, such that it can span the desired quality levels uniformly. Additional constraints, such as the amount of CPU one wants to spend in encoding a certain sequence, can be used to decide the density of resolution ladders.

Upon generating resolution ladder 330, encoding engine 160 then executes a set of parallel processing pipelines 340 to process each different resampled sequence 320. Each processing pipeline 340 generates, based on the resampled sequence 320 input thereto, a collection of data points 350. Processing pipeline 340(0) generates data points 350(0), processing pipeline 350(1) generates data points 350(1), and so forth for all processing pipelines 340. Encoding engine 160 then combines all such data points 350 to generate a data set 360. Because encoding engine 160 performs this processing for all shot sequences 220(0) through 220(P), encoding engine 160 generates P different datasets 360. An exemplary processing pipeline 340 is described in greater detail below in conjunction with FIG. 4, and data set 360 is described further in conjunction with FIGS. 5A-5B.

Figure 4:
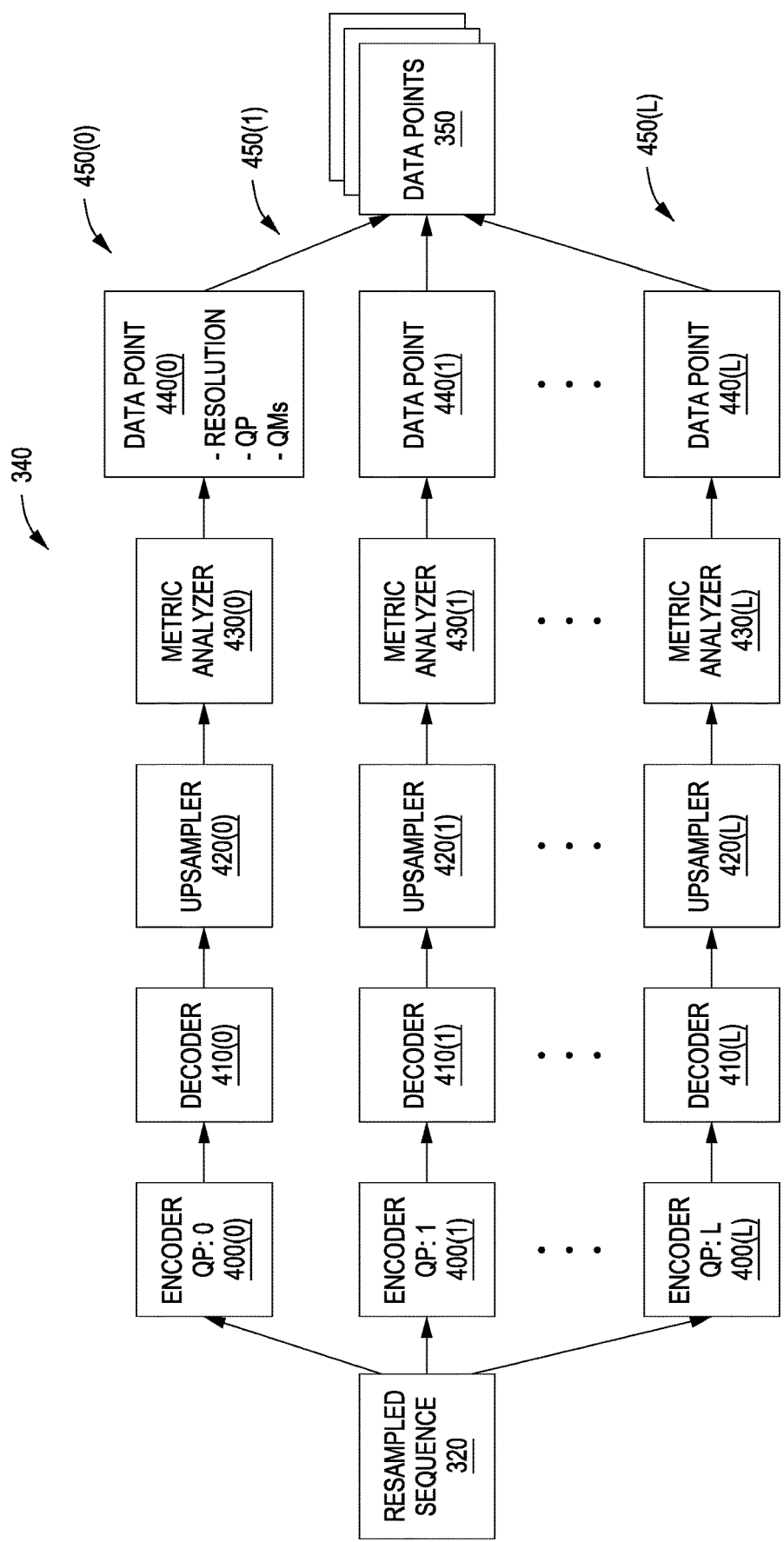
FIG. 4 is a more detailed illustration of the processing pipeline of FIG. 3, according to various embodiments of the present invention.

FIG. 4 is a more detailed illustration of the processing pipeline of FIG. 3, according to various embodiments of the present invention. As shown, processing pipeline 340 receives a resampled sequence 320 and generates, via a set of parallel sub-pipelines 450(0) through 450(L), data points 350. Each sub-pipeline 450 includes an encoder 400, a decoder 410, an upsampler 420, and a metric analyzer 430. Sub-pipeline 450(0) includes encoder 400(0), decoder 410(0), upsampler 420(0), and metric analyzer 430(0), sub-pipeline 450(1) includes encoder 400(1), decoder 410(1), upsampler 420(1), and metric analyzer 430(1), and so forth for all sub-pipelines 450. Encoders 400 and decoders 410 within each sub-pipeline 450 may implement any technically feasible encoding/decoding algorithm(s), including advanced video coding (AVC), high-efficiency video encoding (HEVC), or VP9, among others.

During execution of processing pipeline 340, each encoder 400(0) through 400(L) first encodes resampled sequence 320 with a different quantization parameter (QP). Encoder 400(0) encodes resampled sequence 320 with QP=0, encoder 400(1) encodes resampled sequence 320 with QP=1, and encoder 400(L) encodes resampled sequence 320 with QP=L. Generally, the number of encoders L corresponds to the number of available QPs for the given algorithm implemented by encoders 400. In embodiments where encoders 400 implement AVC encoding algorithm using the x264 implementation, encoders 400 may perform the encoding operation described using different constant rate factors (CRFs) instead of QPs. In various embodiments, encoders 400 may vary any encoding parameter beyond QP or CRF.

Importantly, the encoded resampled sequences generated by encoders 400 may ultimately be included within encoded video sequence 180 shown in FIG. 2B. In the context of this disclosure, these encoded, resampled sequences may be referred to herein as "chunks." A "chunk" generally includes a sequence of video frames encoded with a particular set of encoding parameters. In practice, each chunk is resampled with a particular resolution and then encoded with a given QP. Also, each chunk is generally derived from a given shot sequence. However, persons skilled in the art will understand that a "chunk" in the context of video encoding may represent a variety of different constructs, including a group of pictures (GOP), a sequence of frames, a plurality of sequences of frames, and so forth.

Once encoders 400 encode resampled sequences 320 with the different QPs in the manner described, each sub-pipeline 450 proceeds in relatively similar fashion. Decoders 410 receive the encoded sequences and then decode those sequences. Accordingly, each video sequence output via upsamplers 420(0) through 420(L) has the same resolution. However, those video sequences may have different qualities by virtue of being encoded with different QPs.

In one embodiment, upsamplers 420 upsample the decoded sequences to target resolutions that may be relevant to the display characteristics of a class of endpoint devices. For example, a certain video may be delivered in 3840×2160 resolution, yet be intended to be consumed by a large number of displays in 1920×1080 resolution. Another class of endpoint devices, for example laptop computers, is expected to display the same video in 1280×720 resolution. Yet another class of endpoint devices, for example, tablet or smartphone devices, is expected to display the same video in 960×540 resolution. The decoded sequences can be upsampled to all these target resolutions in order to assess quality, when considering one of these different classes of endpoint devices, correspondingly.

Metric analyzers 330 analyze the upsampled sequences to generate an objective quality metric (QM) for each sequence. Metric analyzers 330 could implement, for example, a video multimethod assessment fusion (VMAF) algorithm to generate a VMAF score for each upsampled sequence, among other possibilities. Although a multitude of video quality metrics, such as VMAF scores, can be calculated at different target resolutions, it should be clear that, when comparing qualities among encodes performed at different resolutions, one needs to use the same target resolution for resampling, after decoding. In the following discussion, we consider one such resolution for upsampling and quality metric calculation, for example the common HD resolution of 1920×1080.

Each metric analyzer 330 then generates a different data point 440 that includes the resolution of resampled sequence 320, the QP implemented by the respective encoder 400, and the computed QM. Thus, for each different QP, processing pipeline 340 generates a separate data point, shown as data point 440(0) through 440(L). Importantly, each data point 440 corresponds to a particular resampled/encoded version of a given shot sequence 220. As described in greater detail below, encoding engine 160 selects resampled/encoded versions of each shot sequence 220 for inclusion into encoded video sequences 180 based on the associated data points 400. Processing pipeline 340 collects all such data points 440 into data points 350, as also shown in FIG. 3.

Referring back now to FIG. 3, encoding engine 160 generates a different set of data points 350(0) through 350(M) for each different resampled sequence 320(0) through 320(M), and then collects these data points 350 to data set 360. Accordingly, data set 360 includes M*L data points, because encoder 160 generates a data point in data set 360 for each combination of the M different resampled sequences 320 and the L different QPs. One does not necessarily need to use the same number of QPs or the same QP values for each resolution, but instead use a fully customized number of QPs and QP values that is suitable for each shot. Encoding engine 160 then performs a processing operation discussed below in conjunction with FIGS. 5A-5B to identify the particular data points within data set 360 that minimize distortion and/or bitrate.

Convex Hull Analysis

Figure 5A:
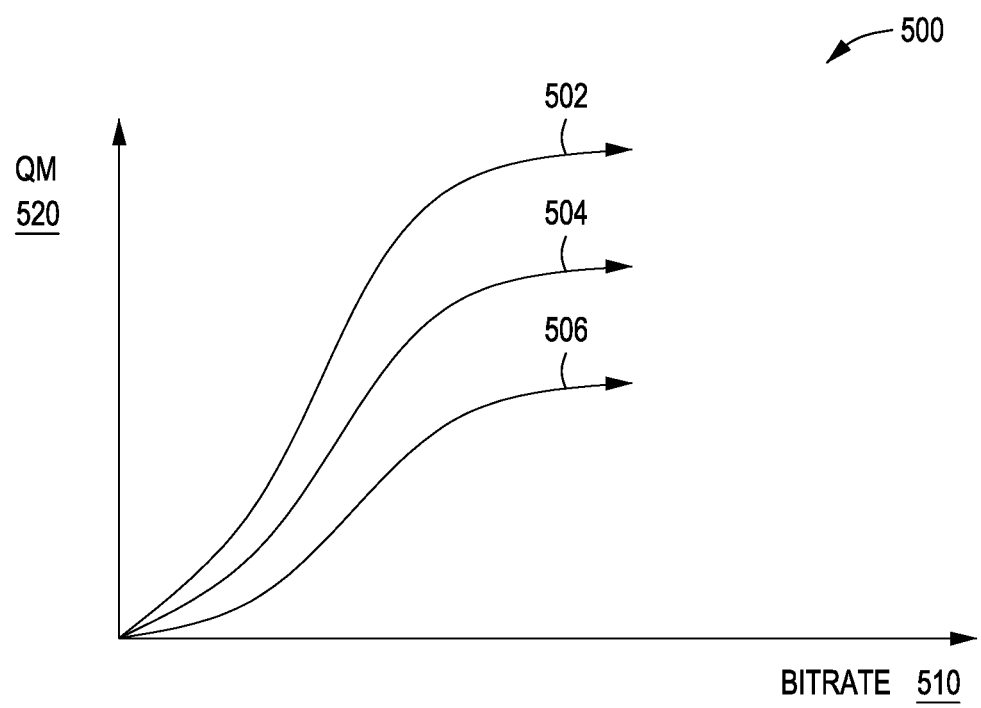
FIG. 5A is a graph of bitrate versus quality that is generated based on the dataset of FIG. 3, according to various embodiments of the present invention.

FIG. 5A is a graph of bitrate versus quality that is generated based on the dataset of FIG. 3, according to various embodiments of the present invention. As shown, a graph 500 includes a bitrate axis 510 and a quality metric (QM) axis 520. Graph 500 also includes quality curves 502, 504, and 506 plotted against bitrate axis 510 and QM axis 520. Each curve shown corresponds to a different resolution encoding for a particular shot sequence 220 and therefore may be derived from a particular set of data points 350, where each data point 440 in a given set corresponds to a particular combination of resolution, QP, and QM. Encoding engine 160 generates the data points included in curves 502, 504, and 506 by converting the resolution of each data point 440 to a given bitrate. Encoding engine 160 could, for example, divide the total number of bits needed for the given resolution by the length of the associated shot sequence 320.

Encoding engine 160 is configured to reprocess dataset 160 plotted in FIG. 5A to replace QM with a distortion metric. Encoding engine 160 may compute a given distortion metric by inverting a QM value, subtracting the QM value from a constant value, or performing other known techniques for converting quality to distortion. Encoding engine 160 then generates a convex hull based on the converted values, as discussed below in conjunction with FIG. 5B.

Figure 5B:
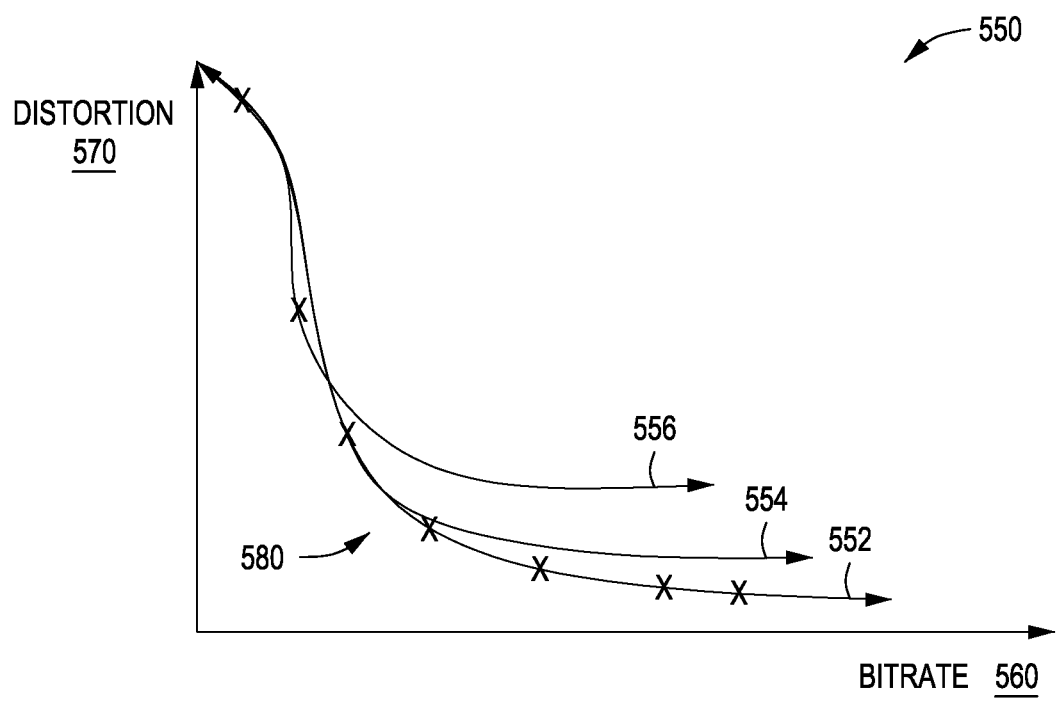
FIG. 5B is a graph of convex hull data points that is generated based on the dataset of FIG. 3, according to various embodiments of the present invention.

FIG. 5B is a graph of convex hull data points that is generated based on the dataset of FIG. 3, according to various embodiments of the present invention. As shown, graph 550 includes bitrate axis 560 and distortion axis 570. Encoding engine 160 plots distortion curves 552, 554, and 556 against bitrate axis 560 and distortion axis 570. Then, encoding engine 160 computes convex hull points 580 by identifying points across all curves that form a boundary where all points reside on one side of the boundary (in this case, the right side of the boundary) and also are such that connecting any two consecutive points on the convex hull with a straight line leaves all remaining points on the same side. In this manner, encoding engine 160 may generate convex hull points 580 for each shot sequence 220. Persons skilled in the art will understand that many techniques for generating convex hulls are well known in the field of mathematics, and all such techniques may be implemented to generate convex hull 580. In one embodiment, encoding engine 160 applies machine learning techniques to estimate convex hull points 580 based on various parameters of the associated source video sequence 170. In this manner, some of the computations discussed thus far may be streamlined and/or avoided entirely. Encoding engine 160 performs the processing described in conjunction with FIGS. 5A-5B via a sequence of processing stages discussed below in conjunction with FIG. 6.

Figure 6:
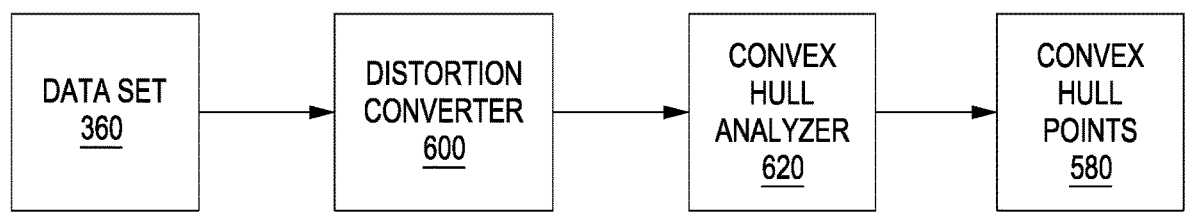
FIG. 6 illustrates how the encoding engines of FIG. 1B generate the convex hull data points of FIG. 5B, according to various embodiments of the present invention.

FIG. 6 illustrates how the encoding engines of FIG. 1B generate the convex hull data points of FIG. 5B, according to various embodiments of the present invention. As shown, a distortion converter 600 and convex hull analyzer 620 cooperatively process dataset 360 to generate convex hull points 580. In operation, distortion converter 600 receives data set 360 and then converts the QM values included in that dataset to distortion values. Then, convex hull analyzer 620 computes the convex hull for the dataset 360 to generate convex hull points 580.

In this manner, encoding engine 160 computes convex hull points 580 for each shot sequence 320 based on the associated dataset 360. Thus, encoding engine 160 generates P sets of convex hull points 580 based on the P different shot sequences 320. Again, each set of convex hull points 580 includes data points that describe, for one shot sequence, the distortion and bitrate for a particular resampled, encoded version of the shot sequence. That version is resampled with a given resolution and encoded with a given QP. Encoding engine 160 collects all convex hulls 580 generated for all P shot sequences 320 and then performs additional processing to generate encoded video sequences 180, as described in greater detail below in conjunction with FIG. 7.

Assembling Encoded Video Sequences Via Trellis Iteration

Figure 7:
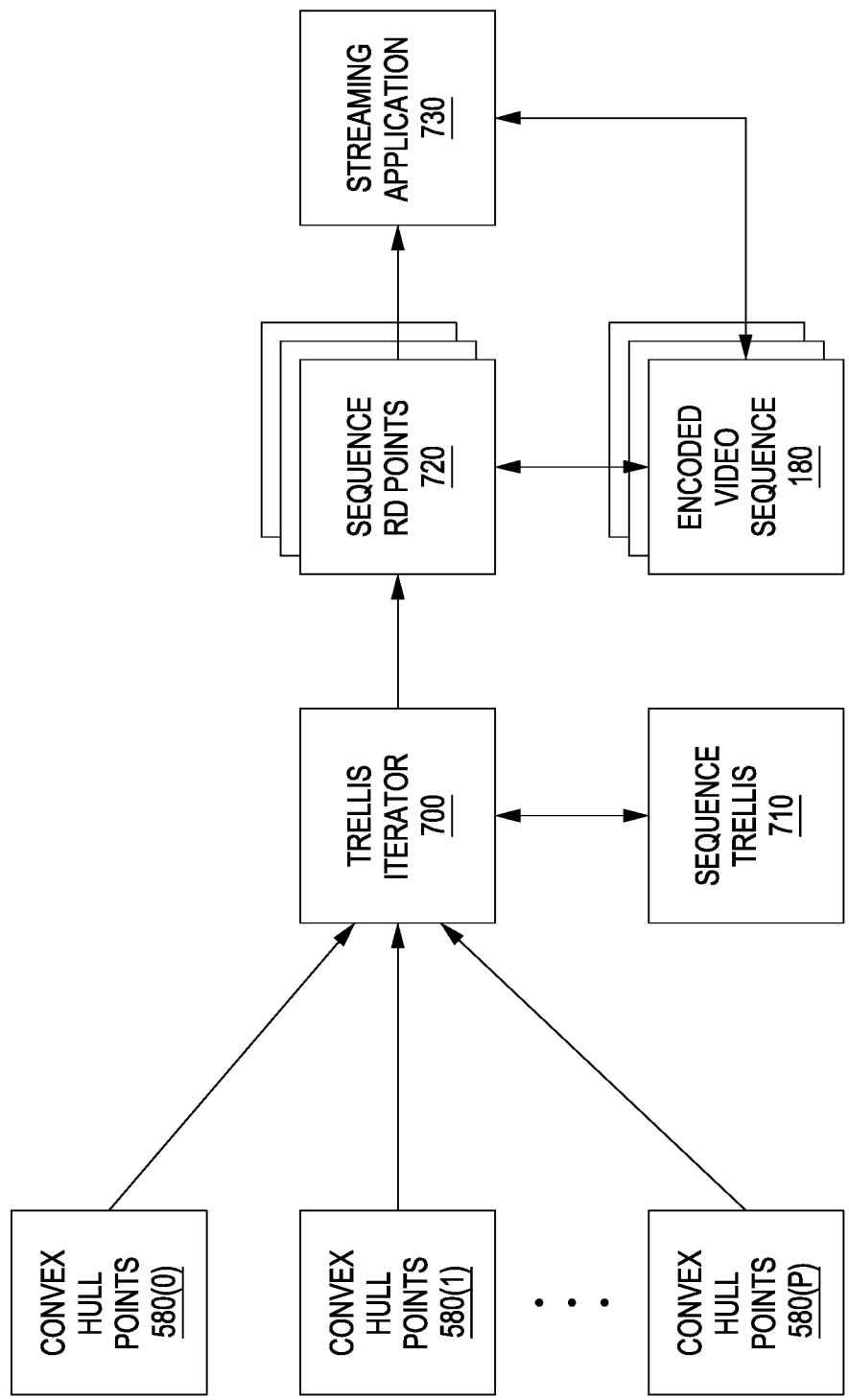
FIG. 7 illustrates how the encoding engines of FIG. 1B generate different versions of the video sequence of FIG. 2 using a plurality of convex hulls, according to various embodiments of the present invention.

FIG. 7 illustrates how the encoding engines of FIG. 1B generate different versions of the video sequence of FIG. 2 using a plurality of convex hulls, according to various embodiments of the present invention. As shown, a trellis iterator 700 receives convex hull points 580(0) through 580(P) and then iteratively updates a sequence trellis 710 to generate sequence RD points 720. Trellis iterator 700 is a software module included within encoding engine 160. Sequence trellis 710 is a data structure that is described in greater detail below in conjunction with FIGS. 8A-8D. Sequence RD points 720 include bitrate-distortion (RD) points generated for different combinations of resampled, encoded sequences.

Each sequence RD point 720 corresponds to a different encoded video sequence 180. Each encoded video sequence 180 includes a different combination of the resampled, encoded shot sequences discussed above. A streaming application 730 is configured to stream encoded video sequences 180 to an endpoint device based on sequence RD points 720. Each encoded video sequence 180 minimizes distortion (on average) across all shot sequences in the video sequence for a given average bitrate associated with the video sequence, as also discussed in greater detail below in conjunction with FIG. 9. Trellis iterator 700 generates these different sequences using a technique described in greater detail below.

FIGS. 8A-8D illustrate in greater detail how the encoding engines of FIG. 1B assemble chunks of video content into an encoded video sequence, according to various embodiments of the present invention. As shown in FIGS. 8A-8D, a sequence trellis 710 includes a shot axis 800 and a bitrate axis 810. Sequence trellis 710 also includes columns of convex hull points 580, where each column corresponds to a particular shot sequence. For example, the zeroth column included in sequence trellis 710 corresponds to convex hull points 580(0). Hull points within any column are ranked according to ascending bitrate (and, by construction, descending distortion). Hull points are also guaranteed to have negative slopes that—in magnitude—are decreasing as a function of bitrate.

For convenience, convex hull points 580 are individually indexed according to the following system. For a given point, the first number is an index of the shot sequence, and the second number is an index into the bitrate ranking of those hull points. For example, convex hull point 00 corresponds to the zeroth shot sequence and the zeroth ranked bitrate (in this case the lowest bitrate). Similarly, convex hull point 43 corresponds to the fourth shot sequence and the third ranked bitrate (in this case the highest ranked bitrate).

Each convex hull point included within trellis 710 corresponds to a different resampled, encoded version of a shot sequence 220, as described. Encoding engine 160 generates encoded video sequences 180 shown in FIG. 2B by combining these resampled, encoded versions of shot sequences 220. Encoding engine 160 implements sequence trellis 710 to iteratively perform this combining technique.

Figure 8A:
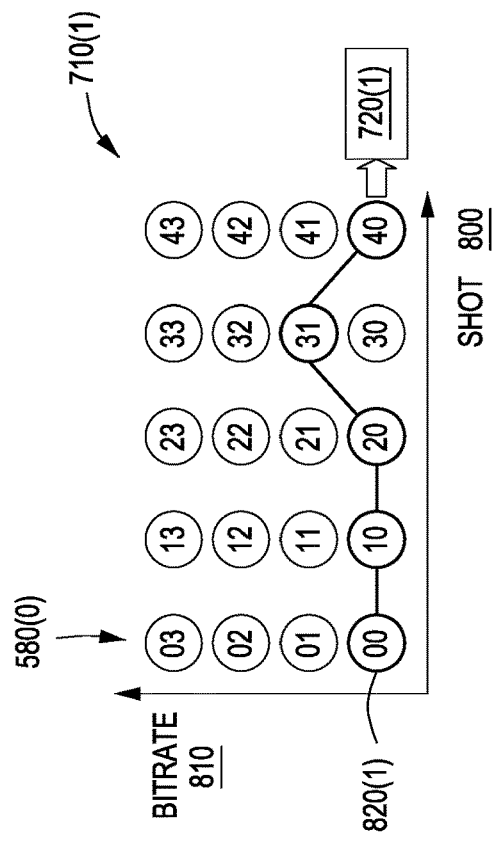
FIGS. 8A-8D illustrate in greater detail how the encoding engines of FIG. 1B assemble chunks of video content into an encoded video sequence, according to various embodiments of the present invention.
Figure 8B:
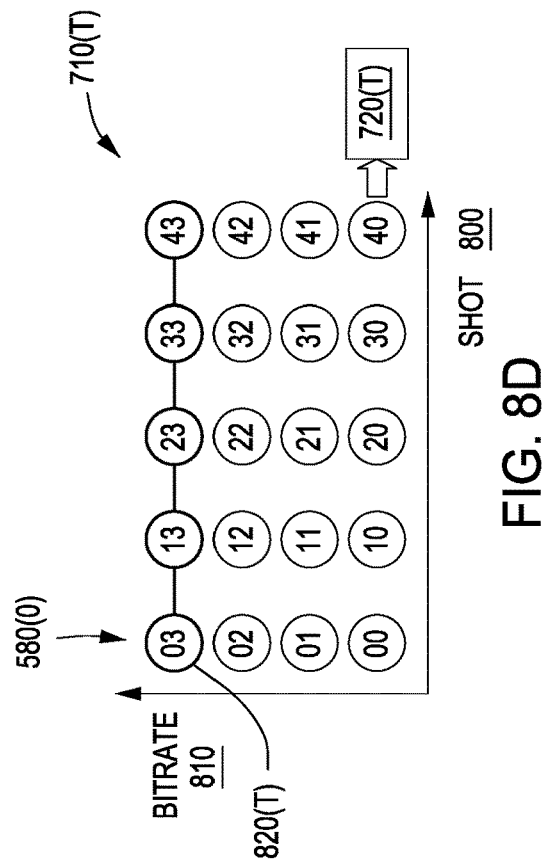

Each of FIGS. 8A-8D illustrates a different version of sequence trellis 710 generated by trellis iterator 700 at a different iteration. FIG. 8A illustrates sequence trellis 710(0)

in an initial state. Here, trellis iterator 700 generates sequence 820(0) of convex hull points that includes hull points 00, 10, 20, 30, and 40. These initially selected hull points have the lowest bitrate encoding and highest distortion, and therefore reside at the bottom of the respective columns. Based on sequence 820(0), trellis iterator 700 generates an encoded video sequence 180 that includes the resampled, encoded shot sequences 220 associated with each of convex hull points 00, 10, 20, 30, and 40. Trellis iterator 700 also generates sequence RD point 720(0) based on that encoded video sequence 180.

Trellis iterator 710 then computes, for each convex hull point within sequence 820(0), the rate of change of distortion with respect to bitrate between the convex hull point and the above-neighbor of the convex hull point. For example, trellis iterator 710 could compute the rate of change of distortion with respect to bitrate between nodes 00 and 01, 10 and 11, 20 and 21, 30 and 31, and 40 and 41. The computed rate of change for the convex hull point associated with a given resampled, encoded shot sequence 220 represents the derivative of the distortion curve associated with that shot sequence, taken at the convex hull point.

Trellis iterator 710 selects the derivative having the greatest magnitude, and then selects the above neighbor associated with that derivative for inclusion in a subsequent sequence 820. For example, in FIG. 8B, trellis iterator 700 determines that the derivative associated with convex hull point 30 is greatest, and therefore includes convex hull point 31 (the above-neighbor of convex hull point 30) in sequence 820(1). Based on sequence 820(1), trellis iterator 700 generates an encoded video sequence 180 that includes the resampled, encoded shot sequences 220 associated with each of convex hull points 00, 10, 20, 31, and 40. Trellis iterator 710 then generates sequence RD point 720(1) based on that encoded video sequence 180. Trellis iterator 710 performs this technique iteratively, thereby ascending trellis 710, as shown in FIGS. 8C-8D.

Figure 8C:
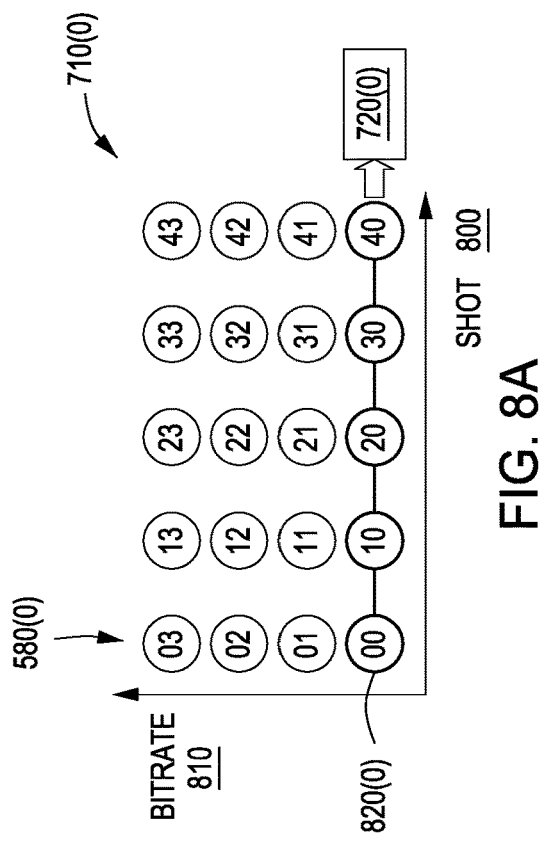
Figure 8D:
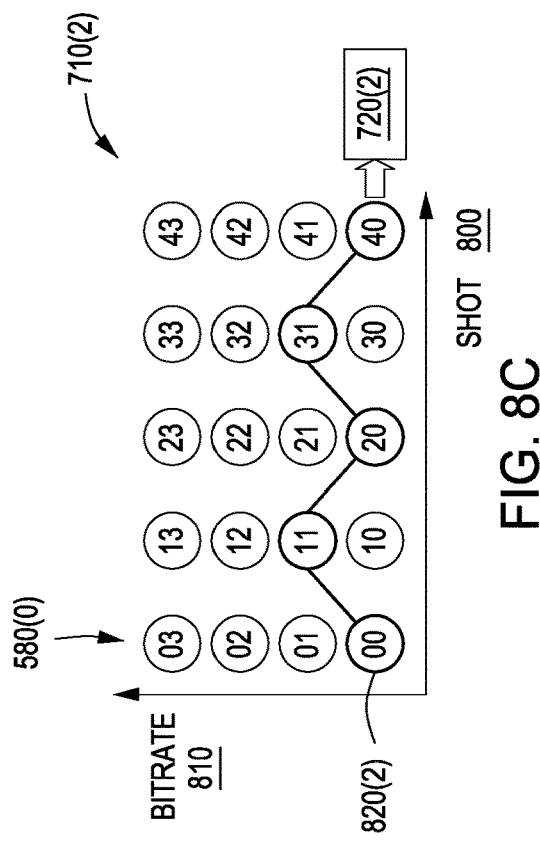

In FIG. 8C, trellis iterator 700 determines that the derivative associated with convex hull point 10 is greatest compared to other derivatives, and then selects convex hull point 11 for inclusion in sequence 820(2). Based on sequence 820(2), trellis iterator 700 generates an encoded video sequence 180 that includes the resampled, encoded shot sequences 220 associated with each of convex hull points 11, 10, 20, 31, and 40. Trellis iterator 700 also generates sequence RD point 720(2) based on that encoded video sequence 180. Trellis iterator 700 continues this process until generating sequence 820(T) associated with trellis iteration 710(T), as shown in FIG. 8D. In this manner, trellis iterator 700 incrementally improves sequences 820 by selecting a single hull point for which bitrate is increased and distortion is decreased, thereby generating a collection of encoded video sequences 180 with increasing bitrate and decreasing distortion.

In one embodiment, trellis iterator 700 adds convex hull points prior to ascending trellis 710 in order to create a terminating condition. In doing so, trellis iterator 700 may duplicate convex hull points having the greatest bitrate to cause the rate of change between the second to last and the last convex hull point to be zero. When this zero rate of change is detected for all shots, i.e. when the maximum magnitude of rate of change is exactly zero, trellis iterator 700 identifies the terminating condition and stops iterating.

Referring back now to FIG. 7, trellis iterator 700 generates encoded video sequences 180 that correspond to the sequences 820 shown in FIGS. 8A-8D via the trellis technique described above. Because trellis iterator 700 generates sequences 820 in an ascending manner to reduce distortion and increase bitrate, encoded video sequences 180 span a range from high distortion and low bitrate to low distortion and high bitrate. Each sequence RD point 720 provides the distortion and bitrate for a given encoded video sequence 180, and these sequence RD points 720 can be plotted to generate a convex hull, as discussed below in conjunction with FIG. 9.

Figure 9:
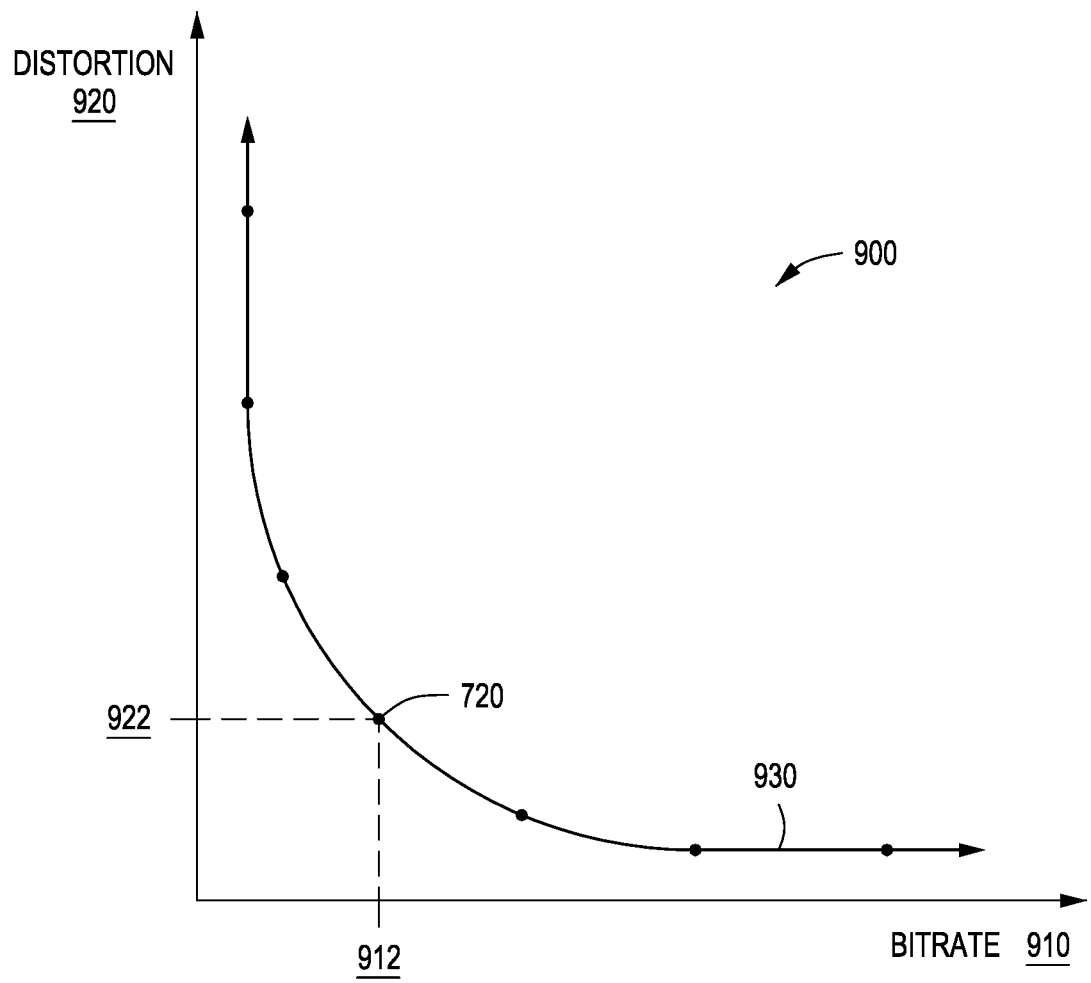
FIG. 9 is a graph of convex hull data points generated for the encoded video sequences shown in FIGS. 8A-8D, according to various embodiments of the present invention.

FIG. 9 is a graph of convex hull data points generated for the different versions of the video sequence shown in FIGS. 8A-8D, according to various embodiments of the present invention. As shown, a graph 900 includes a bitrate axis 910 and a distortion axis 920. Curve 930 is plotted against bitrate axis 910 and distortion axis 920. Curve 930 can be generated based on the collection of sequence RD points 720 corresponding to the encoded video sequences 180 generated via the trellis technique discussed above in conjunction with FIGS. 8A-8D. Accordingly, curve 930 represents distortion as a function of bitrate across all encoded video sequences 180. An exemplary sequence RD point 720 is shown, corresponding to a bitrate 912 and distortion 922.

Based on curve 930, streaming application 730 of FIG. 7 is capable of selecting, for a given available bitrate, the particular encoded video sequence 180 that minimizes distortion for that bitrate. Streaming application 730 may select a single encoded video sequence 180 during streaming, or dynamically select between video sequences. For example, streaming application 730 could switch between encoded video sequences 180 at shot boundaries. With this approach, streaming application 730 may deliver a consistent quality video experience to the end user without requiring excessive bandwidth.

Encoding engine 160 may implement variations on the technique described above in order to reduce storage and computational complexity. In one embodiment, encoding engine 160 implements a "constrained" version of the above approach. Referring now to FIG. 3, to implement the constrained version, encoding engine 160 only encodes resampled sequences 320 with a limited range of QP values. Accordingly, instead of generating versions of resampled sequence 320 for all possible QP values, encoding engine 160 may select a desired range of QP values and then only encode resampled sequence 320 for that range of QP values. Because higher QP values provide quality that is intolerably low, those higher QP values may be deemed unnecessary for encoding purposes. Likewise, because lower QP values require an unreasonable bitrate, those QP values may also be considered unnecessary. Accordingly, encoding engine 160 may constrain encoding to only the QP values that are likely to produce encodes that should actually be delivered to the end-user. In a further embodiment, encoding engine 160 fixes the number of different encodes generated per shot to a constant value. In situations where fewer encodes are generated for a given shot than the constant value, encoding engine 160 may replicate encodes in order to meet the constant value. In various embodiments, encoding engine 160 may limit the number of values for an encoding parameter used for encoding purposes in any technically feasible fashion. For instance, encoding engine 160 may select a subset of possible values for the encoding parameter based on one or more efficiency-related criteria.

In another embodiment, encoding engine 160 implements an "iterative" version of the above approach whereby encoding engine 160 performs multiple encoding passes to determine an encoding having a target bitrate or target distortion level. Initially, encoding engine 160 may perform a first pass using a constrained range of QP values such as that discussed above in conjunction with the "constrained" approach. Once encoding engine 160 has generated a convex hull of sequence RD points, such as that shown in FIG. 9, encoding engine 160 then identifies the sequence RD point closest to the target bitrate or target distortion level. Encoding engine 160 then identifies one or more nearby points on the convex hull and, based on the range of QPs associated with those points, performs additional encodes. In this manner, encoding engine 160 may iteratively refine the range of QPs used for encoding in order to target a particular bitrate or distortion.

In yet another embodiment, encoding engine 160 implements a "fixed quality" version of the above approach and limits the number of shot encodes that need to be stored and subsequently processed. With this approach, encoding engine 160 may produce shot encodes at predetermined, well-spaced quality intervals. Encoding engine 160 may then assemble these shot encodes into complete encoded video sequences 180 having a fixed quality across the entire sequence. The number of shot encodes implemented per shot sequence is a configurable parameter that represents a tradeoff between quality and storage needs. In performing this technique, encoding engine 160 processes convex hull points 580 and then iteratively removes extraneous points until the remaining points represent the desired number of shot encodes. Encoding engine 160 could, for example, iteratively remove convex hull points 580 having the smallest gap relative to adjacent convex hull points 580. This technique allows encoding engine 160 to maximize the minimum quality of shot encodes.

In other embodiments, encoding engine 160 implements a "min-max optimization" version of the above approach. In such an implementation, encoding engine 160 selects a convex hull point for inclusion in a subsequent sequence 820 based on the distortion metrics or quality metrics instead of the derivative values. In particular, encoding engine 150 determines the convex hull point included in sequence 820($x$) that has the maximum distortion metric (or maximum quality metric) and then includes the above-neighbor of the selected convex hull point for inclusion in the subsequent sequence 820($x$+1).

In related embodiments, when ascending sequence trellis 710 encoding engine 160 may tradeoff changes in slope between convex hull points 580 with actual quality value. In doing so, prior to selecting a convex hull point 580 for inclusion into a subsequent sequence, encoding engine 160 may filter out shot sequences (and corresponding convex hull points 580) with a quality metric below a given threshold (or distortion metric above a given threshold). Only after constraining the available shot sequences and convex hull points in this manner does encoding engine 160 generate a subsequent encoded video sequence 180 based on comparing slope values of the remaining convex hull points 580. This approach may maximize both average quality and minimum quality.

With any of the approaches discussed thus far, encoding engine 160 may be configured to enforce specific constraints that limit encoding behavior. For example, encoding engine 160 could be configured to limit the distortion of encoded shot sequences to always fall beneath a maximum tolerable distortion level. However, adjustments to encoding engine 160 may be needed in order to allow compliance with more complex constraints. An example of a complex constraint is the video buffer verifier (VBV) constraint, which is known to those skilled in the art. The VBV constraint generally states that data should arrive with a relatively constant bitrate and be stored in a buffer having relatively constant size. This constraint helps to avoid buffer overflow and/or underflow, among other potential issues. More specific formulations of the VBV constraint are also known to those skilled in the art, including the VBV constant bit rate (CBR) constraint and the VBV variable bit rate (VBR) constraint, although discussion of these specific versions is omitted for brevity.

In one embodiment, encoding engine 160 may be configured to perform the trellis ascension discussed previously in conjunction with FIGS. 8A-8D in a manner that allows the final encoded video sequences 180 to comply with arbitrarily complex sets of constraints, including the VBV constraint discussed above. In doing so, encoding engine 160 analyzes not only the slope values between neighboring convex hull points 580 to select a new hull point for inclusion into a subsequent sequence, but also compliance of each possible subsequent sequence with one or more constraints (e.g., VBV CBR, VBV VBR, and so forth). Thus, for each convex hull point 580 that could be potentially included in a subsequent sequence, encoding engine 160 determines the degree to which that sequence complies with the constraints. Encoding engine 160 then selects convex hull points 580 that allow subsequent sequences to maintain compliance. This form of trellis ascension constitutes a "dynamic programming" approach, and may also represent a form of Viterbi solution to the specific problem of optimizing bitrate versus distortion.

In alternate embodiments, encoding engine 180 and streaming application 730 may cause encoded video sequences 180 to be delivered to endpoint devices in any technically feasible fashion In the same or other embodiments, any amount and type of the functionality associated with encoding engine 180 and streaming application 730 may be implemented in or distributed across any number of host computers 110, any number of cloud computers 140, any number of client computers (not shown), and any number of endpoint devices, in any technically feasible fashion.

For instance, in some embodiments, encoding engine 180 configures streaming application 730 to deliver metadata to client applications executing on endpoint devices. Metadata includes, without limitation, metrics associated with encoded video content at any level of granularity, such as bitrates and quality metrics associated with one or more encoded shot sequences and/or encoded video sequences 180. The client applications may perform any type and amount of adaptive streaming operations based on the metadata in any technically feasible fashion.

In one scenario, a user configures a video player application to stream a movie to a laptop. Streaming application 190 transmits the metadata associated with four different encoded video sequences 180(1-4) to the video player application. The metadata indicates that encoded video sequence 180(4) is associated with the highest bitrate and the highest visual quality, while encoded video sequence 180(1) is associated with the lowest bitrate and the lowest visual quality. At any given time, the video player application selects the encoded video sequence 180 that provides the highest available visual quality during playback of the movie while avoiding playback interruptions due to rebuffering.

Based on an initial available bandwidth and the metadata, the video player application configures streaming application 730 to begin streaming encoded video sequence 180(4) to the video player application. In this fashion, the video player application provides the highest available visual quality during playback of the movie. In general, because of internet traffic, especially during peak times during the day, connection conditions can change quickly and become quite variable. In the described scenario, after ten minutes of playback, the available bandwidth decreases dramatically. Based on the reduced bandwidth and the metadata, the video player application configures streaming application 730 to dynamically switch between encoded video sequence 180(4) and encoded video sequence 180(1). At the next shot boundary, streaming application 730 begins streaming encoded video sequence 180(1) instead of encoded video sequence 180(4) to the video player application. Although the video player application is no longer able to provide the highest available visual quality during playback of the movie, the video player application successfully avoids playback interruptions due to rebuffering.

Persons skilled in the art will understand that the techniques described thus far are applicable beyond video to audio as well. For example, the objective quality metric discussed above could provide a measure of audio quality. The remaining portions of the above techniques would proceed in otherwise similar fashion.

Procedures for Generating Encoded Video Sequences

Figure 10:
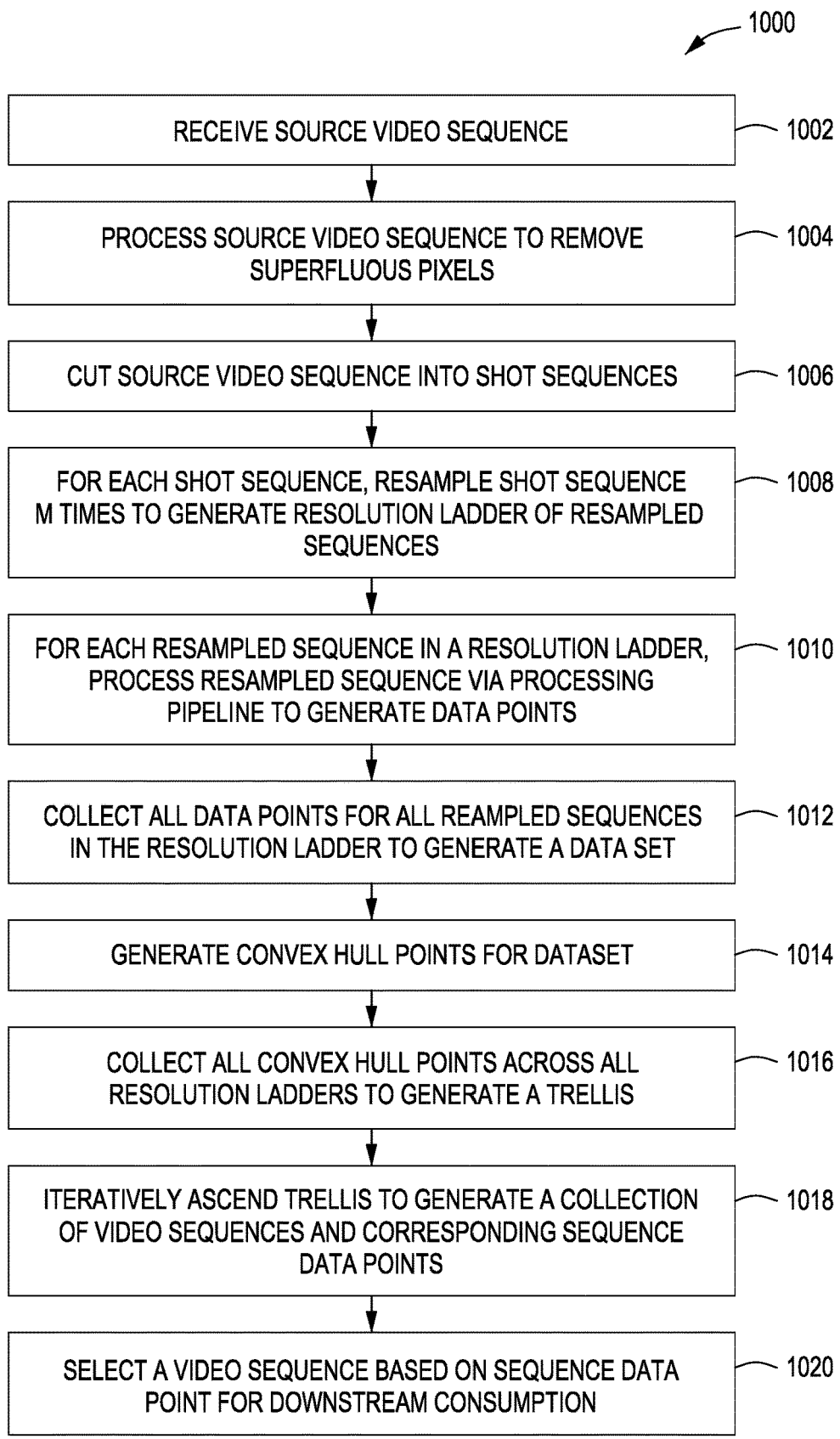
FIG. 10 is a flow diagram of method steps for assembling chunks of video content into an encoded video sequence, according to various embodiments of the present invention.

FIG. 10 is a flow diagram of method steps for assembling chunks of video content into an encoded video sequence, according to various embodiments of the present invention. Although the method steps are described in conjunction with the systems of FIGS. 1-9, persons skilled in the art will understand that any system configured to perform the method steps, in any order, is within the scope of the present invention.

As shown, a method 1000 begins at step 1002, where encoding engine 160 receives source video sequence 170. Source video sequence 170 includes a sequence of frames encoded in a native or "distribution" format. At step 1004, encoding engine 160 processes source video sequence 170 to remove superfluous pixels. Such pixels may reside in horizontal or vertical black bars residing adjacent to the actual content of the video sequence. At step 1006, encoding engine 160 cuts source video sequence 170 into shot sequences 220. Each shot sequence 220 includes a subsequence of frames captured from a particular camera or simulated camera (in the case of computer animated sequences).

The method then proceeds to step 1008. At step 1008, for each shot sequence 220, encoding engine 160 resamples the shot sequence M times to generate a resolution ladder 330 of resampled sequences 320, as shown in FIG. 3. Each resampled sequence 320 has a different resolution. One resampled sequence 320 has the same resolution as the original video sequence.

The method then proceeds to step 1010. For each resampled sequence 320 in resolution ladder 330, encoding engine 160 processes the resampled sequence 320 via a processing pipeline 340 to generate data points 350. Specific processing steps executed by processing pipeline 340 are described in greater detail below in conjunction with FIG. 11. Each data point 350 indicates, for a given resampled sequence 320, the encoding resolution of the sequence, a quality metric for the sequence, and the QP value used to encode the sequence, as discussed in greater detail below in conjunction with FIG. 11.

At step 1012, encoding engine 160 collects all data points 350 for all resampled sequences 320 in resolution ladder 330 to generate a data set 360. Data set 360 corresponds to one shot sequence 220. Each data point in data set 360 corresponds to a different encoding and different resolution of the shot sequence. At step 1014, encoding engine 160 converts the quality metric associated with these data points to a distortion metric, and then generates convex hull points 580 for the dataset, as shown in FIG. 5B. Convex hull points 580 minimize distortion or bitrate across all resampled/encoded shot sequences.

At step 1016, encoding engine 160 collects all convex hull points 580 across all resolution ladders to generate a sequence trellis 710. The construction of an exemplary sequence trellis 710 is discussed in detail in conjunction with FIGS. 8A-8D. At step 1018, encoding engine 160 iteratively ascends the sequence trellis to generate a collection of encoded video sequences 180 and corresponding sequence RD points 720. An approach for ascending sequence trellis 710 is discussed in conjunction with FIG. 12.

At step 1020, streaming application 730 selects an encoded video sequence 180 for streaming based on the associated sequence RD point 720. In doing so, streaming application may select a particular sequence RD point 720 that minimizes distortion for a given available bitrate, and then stream the encoded video sequence 180 associated with that sequence RD point 720 to an endpoint device.

Figure 11:
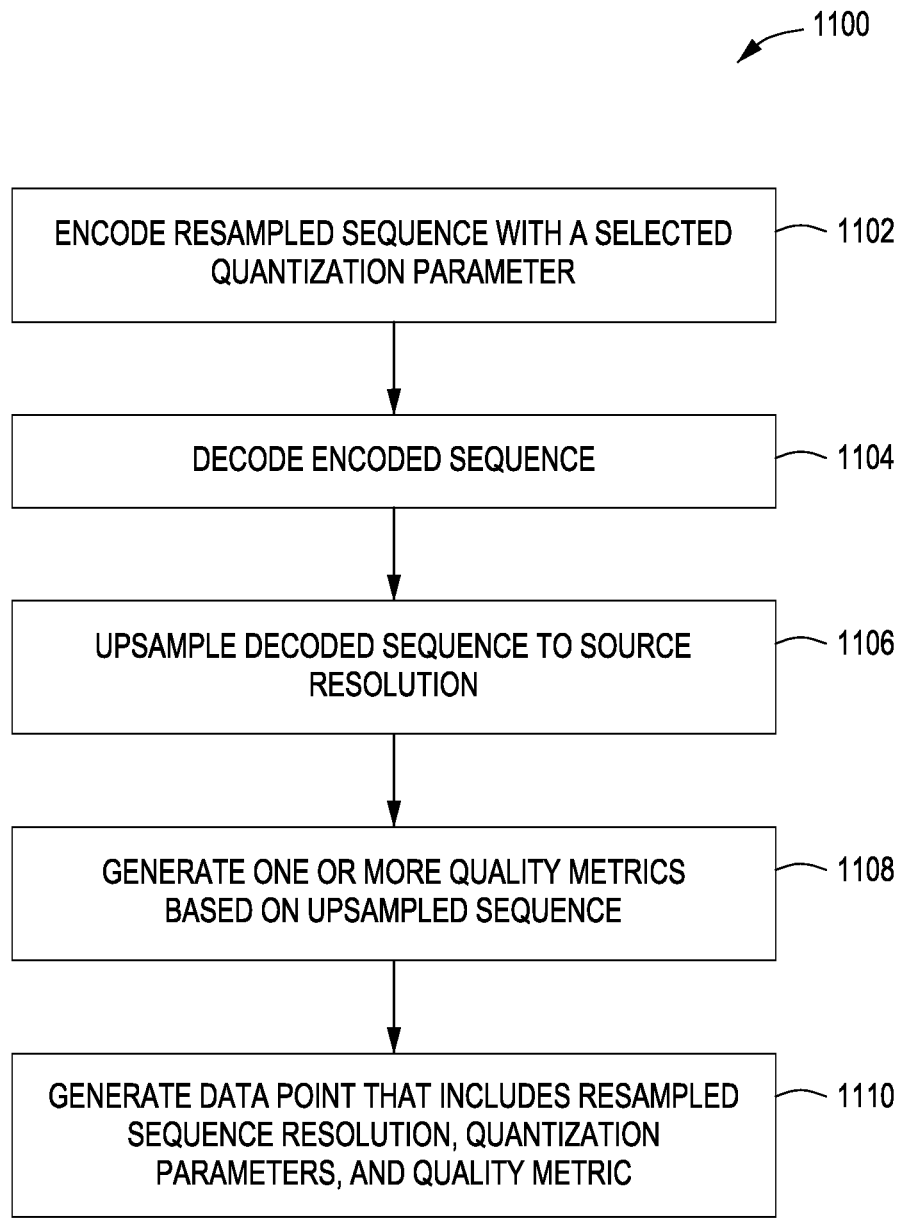
FIG. 11 is a flow diagram of method steps for processing a resampled shot sequence to generate a set of data points, according to various embodiments of the present invention.

FIG. 11 is a flow diagram of method steps for processing a resampled shot sequence to generate a set of data points, according to various embodiments of the present invention. Although the method steps are described in conjunction with the systems of FIGS. 1-9, persons skilled in the art will understand that any system configured to perform the method steps, in any order, is within the scope of the present invention.

Encoding engine 160 implements a method 1100 to perform processing associated with a given sub-pipeline 450 within a processing pipeline 340. Encoding engine 160 may execute multiple sub-pipelines 450 in parallel to implement a given processing pipeline 340, and may thus perform the method 1100 multiple times.

As shown, the method 1100 begins at step 1102, where encoding engine 160 encodes a resampled sequence 320 with a selected quantization parameter (QP). At step 1104, encoding engine 160 then decodes the encoded sequence and, at step 1106, upsamples the decoded sequence to the resolution associated with source video sequence 170. At step 1108, encoding engine 160 generates one or more quality metrics (QMs) for the upsampled sequence. At step 1110, encoding engine 160 generates a data point 440 that includes the resampled sequence resolution, the choice of quantization parameter (QP), and the quality metric (QM) generated for the encoded resampled video sequence.

Figure 12:
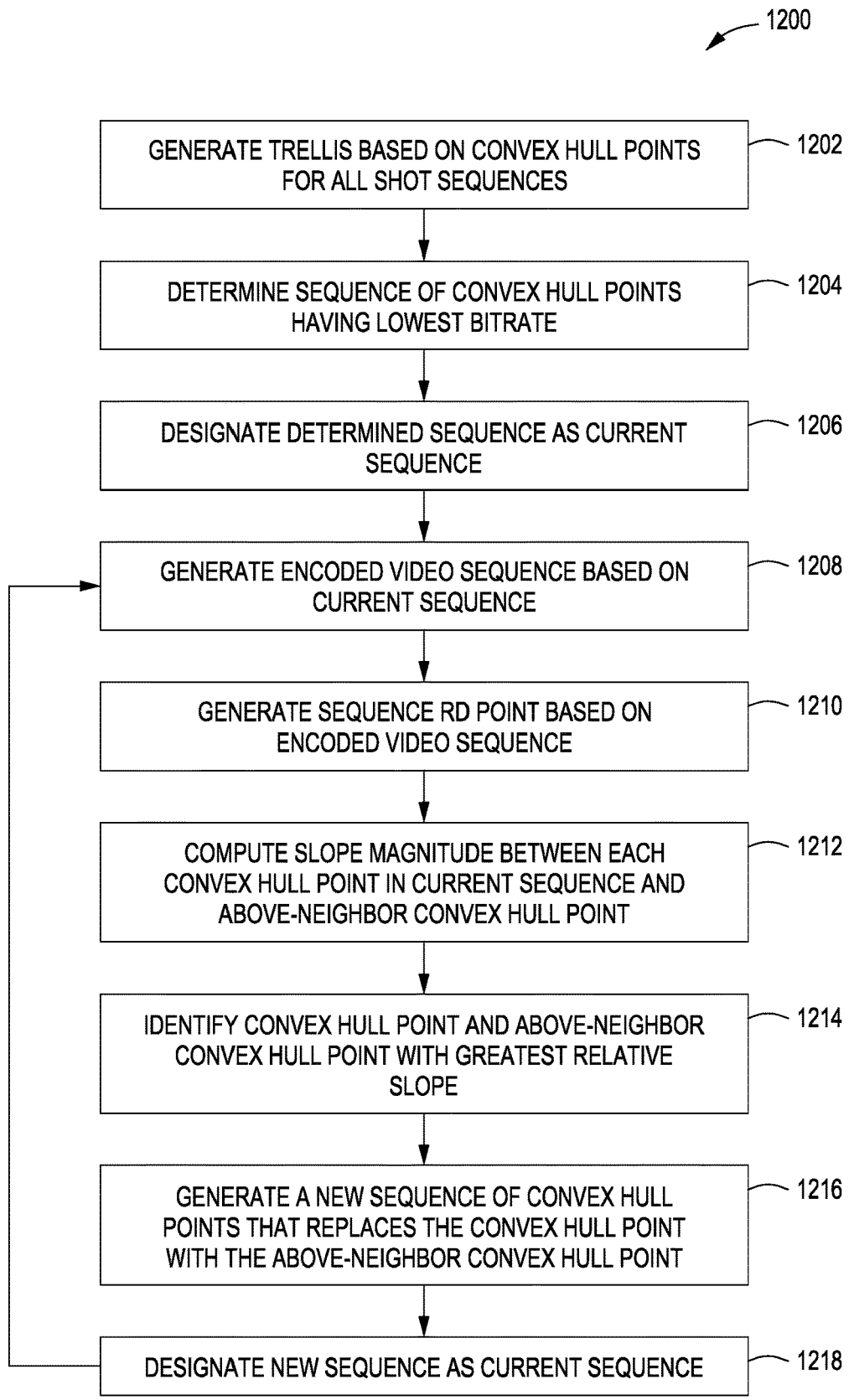
FIG. 12 is a flow diagram of method steps for generating a set of encoded video sequences, according to various embodiments of the present invention.

FIG. 12 is a flow diagram of method steps for generating a set of encoded video sequences, according to various embodiments of the present invention. Although the method steps are described in conjunction with the systems of FIGS. 1-9, persons skilled in the art will understand that any system configured to perform the method steps, in any order, is within the scope of the present invention.

As shown, a method 1200 begins at step 1202, where encoding engine 160 generates a sequence trellis 710 based on convex hull points 580 for all shot sequences 220. Sequence trellis 710, as discussed above in conjunction with FIGS. 8A-8D, includes individual columns of convex hull points 580, where each column corresponds to a particular shot sequence. Accordingly, an encoded version of source video sequence 170 may be constructed by collecting one encoded, resampled shot sequence 220 from each such column.

At step 1204, encoding engine 160 determines a sequence of convex hull points 580 having the lowest bitrate. At step 1206, encoding engine 160 designates the determined sequence as the "current sequence." At step 1208, encoding engine generates an encoded video sequence based on the current sequence. In doing so, encoding engine 160 collects each resampled, encoded shot sequence 220 associated with the sequence of convex hull points 580 to construct an encoded version of the source video sequence 170. At step 1210, encoding engine 160 generates a sequence RD point 720 based on that encoded video sequence.

At step 1212, encoding engine 160 computes the magnitude of the slope between each convex hull point in the current sequence and the above-neighbor convex hull point. The "above-neighbor" of a given convex hull point resides immediately above the convex hull point and in the same column. At step 1214, encoding engine 160 identifies the convex hull point and above-neighbor convex hull point with greatest slope magnitude relative to one another. At step 1216, encoding engine 160 generates a new sequence of convex hull points that replaces the convex hull point with the above-neighbor convex hull point. Finally, at step 1218, encoding engine 160 designates the new sequence as the "current sequence" and returns to step 1208. Encoding engine 160 may repeat the method 1200 until generating an encoded sequence 170 with maximum bitrate compared to other sequences, or until another terminating condition is met.

In this manner, encoding engine 160 "climbs" sequence trellis 710 by determining subsequent versions of the current sequence that maximally reduce distortion and bitrate compared to other versions. By ascending sequence trellis 710 in this manner, encoding engine 160 need not consider all possible combinations of all resampled, encoded shot sequences (also referred to herein as "chunks"). Accordingly, encoding engine 160 may conserve considerable computing resources while still determining a spectrum of encoded video sequences that optimizes distortion for a range of bitrates.

In sum, an encoding engine encodes a video sequence to provide optimal quality for a given bitrate. The encoding engine cuts the video sequence into a collection of shot sequences. Each shot sequence includes video frames captured from a particular capture point. The encoding engine resamples each shot sequence across a range of different resolutions, encodes each resampled sequence with a range of quality parameters, and then upsamples each encoded sequence to the original resolution of the video sequence. For each upsampled sequence, the encoding engine computes a quality metric and generates a data point that includes the quality metric and the resample resolution. The encoding engine collects all such data points and then computes the convex hull of the resultant data set. Based on all convex hulls across all shot sequences, the encoding engine determines an optimal collection of shot sequences for a range of bitrates.

At least one advantage of the techniques described herein is that the video sequence can be streamed to an end-user with the best available quality for a given bitrate. Conversely, for a given desired quality, the video sequence can be provided with the minimum possible bitrate.

1. Some embodiments of the invention include computer-implemented method, comprising: generating a first set of encoded chunks for a source video sequence, generating a first set of data points based on the first set of encoded chunks, performing one or more convex hull operations across the first set of data points to compute a first subset of data points that are optimized across at least two metrics, computing a first slope value between a first data point included in the first subset of data points and a second data point included in the first subset of data points, and determining, based on the first slope value, that a first encoded chunk associated with the first data point should be included in a final encoded version of the source video sequence.

2. The computer-implemented method of clause 1, wherein generating the first set of encoded chunks comprises: identifying within the source video sequence a first sequence of frames that is associated with a first point of capture, resampling the first sequence of frames at a plurality of different resolutions to generate a resolution ladder of resampled versions of the first sequence of frames, and encoding each resampled version of the first sequence of frames with a different encoding parameter to generate the first set of encoded chunks.

3. The computer-implemented method of any of clauses 1 and 2, wherein generating the first set of data points comprises: decoding each encoded chunk in the first set of encoded chunks to generate a first set of decoded chunks, upsampling each decoded chunk in the first set of decoded chunks to a source resolution associated with the source video sequence to generate a first set of upsampled chunks, and generating a different data point for each upsampled chunk in the first set of upsampled data chunks.

4. The computer-implemented method of any of clauses 1, 2, and 3, wherein a specific data point in the first set of data points is generated by: generating a specific objective quality metric for a specific upsampled chunk in the first set of upsampled chunks, converting the specific objective quality metric to a specific distortion metric, computing a bitrate for the specific upsampled chunk, combining the specific distortion metric and the bitrate to generate the specific data point.

5. The computer-implemented method of any of clauses 1, 2, 3, and 4, wherein performing one or more convex hull operations across the first set of data points to compute the first subset of data points comprises: determining a first region that includes the first set of data points, identifying a first boundary of the first region, wherein no data points in the first set of points reside on a first side of the first boundary, discarding any data points that do not reside along the first boundary, wherein each data point that resides along the first boundary optimizes the first metric with respect to the second metric.

6. The computer-implemented method of any of clauses 1, 2, 3, 4, and 5, wherein the first metric comprises distortion and the second metric comprises bitrate.

7. The computer-implemented method of any of clauses 1, 2, 3, 4, 5, and 6, further comprising: generating a second set of encoded chunks for the source video sequence, generating a second set of data points based on the second set of encoded chunks, performing one or more convex hull operations across the second set of data points to compute a second subset of data points that are optimized across the at least two metrics, and computing a second slope value between a third data point included in the second subset of data points and a fourth data point included in the second subset of data points.

8. The computer-implemented method of any of clauses 1, 2, 3, 4, 5, 6, and 7, wherein determining that the first encoded chunk associated with the first data point should be included in the final encoded version of the source video sequence comprises determining that the first slope has a greater magnitude than the second slope.

9. The computer-implemented method of any of clauses 1, 2, 3, 4, 5, 6, 7, and 8, further comprising determining that a second encoded chunk associated with the fourth data point should be included in another encoded version of the source video sequence based on determining that the second slope value is greater than other slope values associated with other subsets of data points.

10. The computer-implemented method of any of clauses 1, 2, 3, 4, 5, 6, 7, 8, and 9, wherein the first set of encoded chunks is associated with a first sequence of video frames captured continuously from a first point of capture, and a second set of encoded chunks is associated with a second sequence of video frames captured continuously from a second point of capture.

11. A non-transitory computer-readable medium storing program instructions that, when executed by a processor, configures the processor to perform the steps of: generating a first set of encoded chunks for a source video sequence, generating a first set of data points based on the first set of encoded chunks, performing one or more convex hull operations across the first set of data points to compute a first subset of data points that are optimized across at least two metrics, computing a first slope value between a first data point included in the first subset of data points and a second data point included in the first subset of data points, and determining, based on the first slope value, that a first encoded chunk associated with the first data point should be included in a final encoded version of the source video sequence.

12. The non-transitory computer-readable medium of clause 11, wherein the step of generating the first set of encoded chunks comprises identifying within the source video sequence a first sequence of frames that is associated with a first point of capture, resampling the first sequence of frames at a plurality of different resolutions to generate a resolution ladder of resampled versions of the first sequence of frames, and encoding each resampled version of the first sequence of frames with a different encoding parameter to generate the first set of encoded chunks.

13. The non-transitory computer-readable medium of any of clauses 11 and 12, wherein the step of generating the first set of encoded chunks comprises generating a plurality of values for an encoding parameter based on a plurality of possible values and a maximum number of encoded chunks; and encoding a plurality of resampled versions of a first sequence of frames based on the plurality of values for the encoding parameter to generate the first set of encoded chunks.

14. The non-transitory computer-readable medium of any of clauses 11, 12, and 13, wherein the step of generating the first set of data points comprises decoding each encoded chunk in the first set of encoded chunks to generate a first set of decoded chunks; upsampling each decoded chunk in the first set of decoded chunks to a source resolution associated with the source video sequence to generate a first set of upsampled chunks; and generating a different data point for each upsampled chunk in the first set of upsampled data chunks.

15. The non-transitory computer-readable medium of any of clauses 11, 12, 13, and 14, wherein the step of performing one or more convex hull operations across the first set of data points to compute the first subset of data points comprises: determining a first region that includes the first set of data points, identifying a first boundary of the first region, wherein no data points in the first set of points reside on a first side of the first boundary, including any data points that reside along the first boundary in the first subset of data points.

16. The non-transitory computer-readable medium of any of clauses 11, 12, 13, 14, and 15, wherein the first metric comprises distortion and the second metric comprises bitrate.

17. The non-transitory computer-readable medium of any of clauses 11, 12, 13, 14, 15, and 16, further comprising the steps of: generating a second set of encoded chunks for the source video sequence, generating a second set of data points based on the second set of encoded chunks, performing one or more convex hull operations across the second set of data points to compute a second subset of data points that are optimized across the at least two metrics, and computing a second slope value between a third data point included in the second subset of data points and a fourth data point included in the second subset of data points.

18. The non-transitory computer-readable medium of any of clauses 11, 12, 13, 14, 15, 16, and 17, wherein determining that the first encoded chunk associated with the first data point should be included in the final encoded version of the source video sequence comprises determining that the first slope has a greater magnitude than the second slope.

19. The non-transitory computer-readable medium of any of clauses 11, 12, 13, 14, 15, 16, 17, and 18, further comprising determining that a second encoded chunk associated with the fourth data point should not be included in another encoded version of the source video sequence based on determining that the second slope value is less than one or more other slope values associated with one or more other subsets of data points.

20. The non-transitory computer-readable medium of any of clauses 11, 12, 13, 14, 15, 16, 17, 18, and 19, wherein the first set of encoded chunks is associated with a first shot sequence and a second set of encoded chunks is associated with a second shot sequence.

21. Some embodiments include a system, comprising: a memory storing a software application, and a processor that is couple to the memory and, when executing the software application, is configured to: generate a first set of encoded chunks for a source video sequence, generate a first set of data points based on the first set of encoded chunks, perform one or more convex hull operations across the first set of data points to compute a first subset of data points that are optimized across at least two metrics, compute a first slope value between a first data point included in the first subset of data points and a second data point included in the first subset of data points, and determine, based on the first slope value, that a first encoded chunk associated with the first data point should be included in a final encoded version of the source video sequence.

22. The system of clause 21, wherein, when executing the software application, the processor is further configured to: generate the first set of encoded chunks, generate the first set of data points, perform the one or more convex hull operations, compute the first slope value, and determine that the first encoded chunk associated with the first data point should be included in the final encoded version of the source video sequence.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed.

Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

The invention claimed is:

1. A computer-implemented method, comprising:
generating multiple sets of encoded chunks for a source video sequence, wherein each set of encoded chunks corresponds to a different shot sequence included in the source video sequence;
performing one or more convex hull operations across a first set of data points associated with a first set of encoded chunks to generate a first convex hull, wherein the first set of encoded chunks is included in the multiple sets of encoded chunks and corresponds to a first shot sequence;
computing a first slope value between two data points included in the first convex hull;
comparing the first slope value to a second slope value, wherein the second slope value is computed between two data points included in a second convex hull generated for a second shot sequence; and
including a first encoded chunk from the first set of encoded chunks in a final encoded version of the source video sequence based on the first slope value having a greater magnitude than the second slope value.

2. The computer-implemented method of claim 1, wherein a subset of data points associated with the first convex hull is optimized across at least two metrics, and wherein a first metric included in the at least two metrics comprises distortion and a second metric included in the at least two metrics comprises bitrate.

3. The computer-implemented method of claim 1, wherein generating the multiple sets of encoded chunks comprises:
identifying within the source video sequence a first sequence of frames that is associated with a first point of capture;
resampling the first sequence of frames at a plurality of different resolutions to generate a resolution ladder of resampled versions of the first sequence of frames; and
encoding each resampled version of the first sequence of frames with a different encoding parameter to generate the first set of encoded chunks.

4. The computer-implement method of claim 3, wherein generating the multiple sets of encoded chunks further comprises:
identifying within the source video sequence a second sequence of frames that is associated with a second point of capture that is different than the first point of capture;
resampling the second sequence of frames at a plurality of different resolutions to generate a resolution ladder of resampled versions of the second sequence of frames; and encoding each resampled version of the second sequence of frames with a different encoding parameter to generate the first set of encoded chunks.

5. The computer-implemented method of claim 1, further comprising generating the first set of data points by:
    decoding each encoded chunk in the first set of encoded chunks to generate a first set of decoded chunks;
    upsampling each decoded chunk in the first set of decoded chunks to a source resolution associated with the source video sequence to generate a first set of upsampled chunks; and
    generating a different data point for each upsampled chunk in the first set of upsampled chunks.

6. The computer-implemented method of claim 5, wherein a specific data point in the first set of data points is generated by:
    generating a specific objective quality metric for a specific upsampled chunk in the first set of upsampled chunks;
    converting the specific objective quality metric to a specific distortion metric;
    computing a bitrate for the specific upsampled chunk; and
    combining the specific distortion metric and the bitrate to generate the specific data point.

7. The computer-implemented method of claim 2, further comprising:
    performing one or more convex hull operations across a second set of data points associated with a second set of encoded chunks associated with the second shot sequence to compute a second subset of data points that are optimized across the at least two metrics; and
    computing the second slope value between a third data point included in the second subset of data points and a fourth data point included in the second subset of data points.

8. The computer-implemented method of claim 7, further comprising generating the second set of data points by:
    decoding each encoded chunk in the second set of encoded chunks to generate a second set of decoded chunks;
    upsampling each decoded chunk in the second set of decoded chunks to a source resolution associated with the source video sequence to generate a second set of upsampled chunks; and
    generating a different data point for each upsampled chunk in the second set of upsampled chunks.

9. The computer-implemented method of claim 2, wherein performing the one or more convex hull operations across the first set of data points to compute the first subset of data points comprises:
    determining a first region that includes the first set of data points;
    identifying a first boundary of the first region, wherein no data points in the first set of points reside on a first side of the first boundary; and
    discarding any data points that do not reside along the first boundary, wherein each data point that resides along the first boundary optimizes a first metric included in the at least two metrics with respect to a second metric included in the at least two metrics.

10. The computer-implemented method of claim 1, wherein the first set of encoded chunks is associated with a first sequence of video frames captured continuously from a first point of capture, and a second set of encoded chunks associated with the second shot sequence is associated with a second sequence of video frames captured continuously from a second point of capture.

11. One or more non-transitory computer-readable media storing program instructions that, when executed by one or more processors, cause the one or more processors to perform the steps of:
    generating multiple sets of encoded chunks for a source video sequence, wherein each set of encoded chunks corresponds to a different shot sequence included in the source video sequence;
    performing one or more convex hull operations across a first set of data points associated with a first set of encoded chunks to generate a first convex hull, wherein the first set of encoded chunks is included in the multiple sets of encoded chunks and corresponds to a first shot sequence;
    computing a first slope value between two data points included in the first convex hull;
    performing a first comparison between the first slope value and a second slope value, wherein the second slope value is computed between two data points included in a second convex hull generated for a second shot sequence; and
    including a first encoded chunk from the first set of encoded chunks in a final encoded version of the source video sequence based on the first comparison.

12. The one or more non-transitory computer-readable media of claim 11, wherein a subset of data points associated with the first convex hull is optimized across at least two metrics, and wherein a first metric included in the at least two metrics comprises distortion, and a second metric included in the at least two metrics comprises bitrate.

13. The one or more non-transitory computer-readable media of claim 11, wherein generating the multiple sets of encoded chunks comprises:
    identifying within the source video sequence a first sequence of frames that is associated with a first point of capture;
    resampling the first sequence of frames at a plurality of different resolutions to generate a resolution ladder of resampled versions of the first sequence of frames; and
    encoding each resampled version of the first sequence of frames with a different encoding parameter to generate the first set of encoded chunks.

14. The one or more non-transitory computer-readable media of claim 13, wherein generating the multiple sets of encoded chunks further comprises:
    identifying within the source video sequence a second sequence of frames that is associated with a second point of capture that is different than the first point of capture;
    resampling the second sequence of frames at a plurality of different resolutions to generate a resolution ladder of resampled versions of the second sequence of frames; and
    encoding each resampled version of the second sequence of frames with a different encoding parameter to generate the first set of encoded chunks.

15. The one or more non-transitory computer-readable media of claim 11, further comprising generating the first set of data points by:
    decoding each encoded chunk in the first set of encoded chunks to generate a first set of decoded chunks;
    upsampling each decoded chunk in the first set of decoded chunks to a source resolution associated with the source video sequence to generate a first set of upsampled chunks; and
    generating a different data point for each upsampled chunk in the first set of upsampled chunks.

16. The one or more non-transitory computer-readable media of claim 15, wherein a specific data point in the first set of data points is generated by:
- generating a specific objective quality metric for a specific upsampled chunk in the first set of upsampled chunks;
- converting the specific objective quality metric to a specific distortion metric;
- computing a bitrate for the specific upsampled chunk; and
- combining the specific distortion metric and the bitrate to generate the specific data point.

17. The one or more non-transitory computer-readable media of claim 11, further comprising:
- performing one or more convex hull operations across a second set of data points associated with a second set of encoded chunks associated with the second shot sequence to compute a subset of data points that are optimized across at least two metrics; and
- computing the second slope value between a third data point included in the subset of data points and a fourth data point included in the subset of data points.

18. The one or more non-transitory computer-readable media of claim 17, further comprising generating the second set of data points by:
- decoding each encoded chunk in the second set of encoded chunks to generate a second set of decoded chunks;
- upsampling each decoded chunk in the second set of decoded chunks to a source resolution associated with the source video sequence to generate a second set of upsampled chunks; and
- generating a different data point for each upsampled chunk in the second set of upsampled chunks.

19. The one or more non-transitory computer-readable media of claim 11, wherein performing the one or more convex hull operations across the first set of data points to generate the first convex hull comprises:
- determining a first region that includes the first set of data points;
- identifying a first boundary of the first region, wherein no data points in the first set of points reside on a first side of the first boundary; and
- discarding any data points that do not reside along the first boundary, wherein each data point that resides along the first boundary optimizes a first metric with respect to a second metric.

20. The one or more non-transitory computer-readable media of claim 11, wherein the first set of encoded chunks is associated with a first sequence of video frames captured continuously from a first point of capture, and a second set of encoded chunks associated with the second shot sequence is associated with a second sequence of video frames captured continuously from a second point of capture.

21. A system, comprising:
- one or more memories storing instructions; and
- one or more processors that are coupled to the one or more memories and, when executing the instructions, are configured to perform the steps of:
  - generating multiple sets of encoded chunks for a source video sequence, wherein each set of encoded chunks corresponds to a different shot sequence included in the source video sequence;
  - performing one or more convex hull operations across a first set of data points associated with a first set of encoded chunks to generate a first convex hull that includes a first subset of data points, wherein the first set of encoded chunks is included in the multiple sets of encoded chunks and corresponds to a first shot sequence;
  - computing a first parameter for a first data point included in the first convex hull;
  - performing a first comparison between the first parameter and a second parameter computed for a second data point included in a second convex hull generated for a second shot sequence; and
  - including a first encoded chunk from the first set of encoded chunks in a final encoded version of the source video sequence based on the first comparison.

* * * * *